US012397410B2

(12) United States Patent
Barth et al.

(10) Patent No.: US 12,397,410 B2
(45) Date of Patent: Aug. 26, 2025

(54) HANDHELD POWER TOOL, IN PARTICULAR A SANDER, HANDHELD POWER TOOL DEVICE, PROTECTIVE DEVICE, HANDHELD POWER TOOL SYSTEM, AND METHOD FOR MANUFACTURING A HANDHELD POWER TOOL DEVICE

(71) Applicant: Robert Bosch GmbH, Stuttgart (DE)

(72) Inventors: Daniel Barth, Leinfelden-Echterdingen (DE); Florian Esenwein, Leinfelden-Echterdingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 18/732,734

(22) Filed: Jun. 4, 2024

(65) Prior Publication Data

US 2024/0408738 A1 Dec. 12, 2024

(30) Foreign Application Priority Data

Jun. 9, 2023 (DE) ..................... 10 2023 205 363.2

(51) Int. Cl.
*B25F 5/02* (2006.01)
*B24B 23/00* (2006.01)
*B24B 23/02* (2006.01)

(52) U.S. Cl.
CPC .............. *B25F 5/02* (2013.01); *B24B 23/005* (2013.01); *B24B 23/02* (2013.01)

(58) Field of Classification Search
CPC .......... B25F 5/02; B24B 23/005; B24B 23/02
See application file for complete search history.

(56) References Cited

U.S. PATENT DOCUMENTS

| | | | | |
|---|---|---|---|---|
| 2015/0202760 A1* | 7/2015 | Roberts | ................ | B25D 17/043 29/436 |
| 2015/0202762 A1* | 7/2015 | Roberts | ................ | B25D 17/043 173/162.2 |
| 2021/0237249 A1* | 8/2021 | Fischer | ..................... | B25F 5/02 |

FOREIGN PATENT DOCUMENTS

| | | | | |
|---|---|---|---|---|
| AU | 2016100638 A4 * | 7/2016 | ............... | A45F 3/14 |
| CN | 103764350 B * | 10/2016 | ............. | B25D 17/00 |
| DE | 202014102429 U1 * | 7/2014 | ................ | B25F 5/02 |
| DE | 112014006502 T5 * | 12/2016 | ............. | B25D 11/00 |
| DE | 102020001076 A1 * | 8/2021 | | |
| WO | 2017/108414 A1 | 6/2017 | | |
| WO | WO-2021199816 A1 * | 10/2021 | | |
| WO | 2023/066717 A1 | 4/2023 | | |

* cited by examiner

*Primary Examiner* — Eyamindae C Jallow

(74) *Attorney, Agent, or Firm* — Maginot, Moore & Beck LLP

(57) ABSTRACT

A handheld power tool device for a handheld power tool, in particular a sander, preferably an orbital sander or a random orbital sander includes a housing unit, which has a handle housing and a drive housing for holding a drive unit. The drive housing defines a drive axis of the drive unit. The power tool device further includes a damping unit which couples the drive housing to the handle housing. The drive housing includes an extension arm, which extends at least radially with respect to the drive axis and on which at least a portion of the damping unit is arranged.

15 Claims, 10 Drawing Sheets

HANDHELD POWER TOOL, IN PARTICULAR A SANDER, HANDHELD POWER TOOL DEVICE, PROTECTIVE DEVICE, HANDHELD POWER TOOL SYSTEM, AND METHOD FOR MANUFACTURING A HANDHELD POWER TOOL DEVICE

This application claims priority under 35 U.S.C. § 119 to patent application no. DE 10 2023 205 363.2, filed on Jun. 9, 2023 in Germany, the disclosure of which is incorporated herein by reference in its entirety.

BACKGROUND

A handheld power tool device for a handheld power tool has already been proposed, comprising a housing unit which has a handle housing and a drive housing for holding a drive unit, with the drive housing defining a drive axis of the drive unit, said power tool also comprising a damping unit which couples the drive housing to the handle housing.

SUMMARY

The invention is based on a handheld power tool device for a handheld power tool, in particular a sander, preferably an orbital sander or a random orbital sander comprising a housing unit which has a handle housing and a drive housing for holding a drive unit, whereby the drive housing defines a drive axis of the drive unit, said power tool also comprising a damping unit that couples the drive housing to the handle housing.

It is proposed that the drive housing comprises an extension arm, which extends at least radially with respect to the drive axis and on which at least a portion of the damping unit is arranged. Advantageously, a particularly efficient decoupling of the handle housing from vibrations on the drive housing can be achieved using simultaneously particularly precise and/or comfortable handheld power tool guidance. A particularly high level of operating convenience can be achieved. A particularly wide support of the drive housing on the handle housing can be advantageously achieved. A particularly stable guidance for the handheld power tool can be achieved in an advantageous manner. A particularly high level of operating safety can be achieved.

In particular, a motor housing of the drive unit defines the drive axis. Preferably, the motor housing comprises a motor holder, in the central longitudinal axis of which a motor axis comes to rest. The drive axis is defined in particular by the motor axis. In particular, the central longitudinal axis is congruent with the drive axis.

The damping unit preferably comprises multiple damping elements. The damping elements are preferably made of at least one elastic material, in particular an elastic plastic. The damping elements can be designed as blocks, rings, ring segments, plates, or the like. The drive housing is preferably connected to the handle housing via the damping elements. The damping unit is in particular intended to decouple the handle housing from the drive housing from vibrations. The handle housing is preferably only connected to the drive housing via the damping unit, in particular the damping elements of the damping unit.

At least a portion of the damping elements can preferably be fixed between the drive housing and the handle housing by means of a clamp. It is also conceivable that the damping elements comprise an adhesive layer for attachment to the drive housing and/or the handle housing. Additionally or alternatively, it is conceivable that at least a portion of the damping elements can be attached to the handle housing and/or the drive housing by means of damping element holders, e.g. recesses, holding bolts, or the like, and/or by means of a screw connection or the like.

In particular, the handle housing is coupled to the drive housing via two different coupling regions of the damping unit. Preferably, the handle housing comprises two inner regions, in particular at a distance from each other, within each of which a portion of the drive housing is arranged. In particular, the two coupling regions are arranged in the two inner regions.

The extension arm is preferably arranged on a side of the drive housing facing a battery pack interface of the sander. The extension arm is preferably arranged inside the handle housing, in particular in an inner region of the two inner regions of the handle housing. The extension arm forms an outermost point of the drive housing, particularly when viewed in a direction perpendicular to the drive axis and along a separating plane of the handle housing. The extension arm is preferably at least partially enclosed by the handle housing.

The portion of the damping unit arranged on the extension arm in particular comprises at least one damping element of the damping elements. The extension arm preferably comprises at least one damping element holder for the at least one damping element. The shape of the damping element is preferably adapted to the damping element holder. The damping element holder is, e.g., designed as a holding bolt, in particular for holding a ring-shaped damping element. The damping element holder is, e.g., intended to hold the at least one damping element perpendicular to the main extension plane of the handle housing, in particular to a main extension plane of a bow-shaped handle of the housing unit, and/or to the separating plane. The “main extension plane” of a structural unit or an element can be understood as a plane which is parallel to a largest side surface of a smallest possible imaginary cuboid, which just completely encloses the structural unit, and in particular extends through the center of the cuboid. The extension arm is, e.g., designed to be T-shaped in particular to hold at least two damping elements. Alternatively, however, it is also conceivable that the damping element holder is, e.g., designed as a recess, in particular for holding a damping element designed as a block, plate or the like. It is conceivable that the at least one damping element is fixed to the damping element holder by the handle housing, in particular handle housing shells of the handle housing. Alternatively or additionally, however, it is also conceivable that the damping element is glued, screwed, or the like to the damping element holder.

In one aspect of the invention, which can be considered in particular on its own as well as in conjunction with other aspects of the invention, the invention is based on a sander, in particular a battery-operated sander, having a tool holder, in particular a sanding pad, having a drive unit, in particular the drive unit specified hereinabove for driving the tool holder and having a housing unit, in particular the housing unit specified hereinabove, which comprises a bow-shaped handle, in particular the bow-shaped handle specified hereinabove. It is proposed that a ratio of a maximum longitudinal extent of a handle recess of the bow-shaped handle to a maximum longitudinal extent of the tool holder is at least 0.35 and at most 0.5. A sander with particularly favorable ergonomic properties can be provided in an advantageous manner. Advantageously, particularly depending on the size of the tool holder, a particularly large amount of space can be provided for an operator’s fingers in the handle recess for guiding the sander. Particularly precise and/or safe handling of the sander can be achieved. A particularly high level of operating convenience can be achieved in an advantageous manner.

The sander is preferably designed as a battery-operated sander. Alternatively, however, it is also conceivable that the sander is designed as a grid-powered sander. The sander is preferably designed as a random orbital sander. Alternatively, however, it is also conceivable that the sander is designed as an orbital sander, a delta sander, a flower sander, or the like.

The tool holder is preferably designed as a sanding pad. The tool holder is preferably designed as a round sanding pad. Alternatively, however, it is also conceivable that the tool holder is designed as a delta pad, as a square, preferably rectangular, sanding pad or as another sanding pad that a skilled person considers useful. In particular, the tool holder comprises fastening means for fastening a tool, preferably a sanding means. The fastening means comprise, e.g., one or multiple Velcro surfaces, one or multiple clips, a combination of these, or other fastening means that a skilled person considers useful. The sanding means is preferably designed as an abrasive paper, an abrasive fleece, an abrasive grid, or the like.

In particular, the drive unit comprises a drive element, preferably an eccentric. The drive element is preferably intended to be driven around a drive axis of the drive unit. The sander preferably comprises an output unit. In particular, the tool holder is a portion of the output unit. The output unit preferably comprises a connecting piece. The connecting piece is arranged on the drive element, preferably attached. The tool holder is preferably attached to the connecting piece, in particular non-rotatably, e.g. by means of a screw or the like. In particular, the output element has an output axis. The output axis preferably extends at least substantially parallel to the drive axis. In particular, the drive axis is at a distance from the output axis. The term "substantially parallel" can in this context be understood to mean an orientation of a direction relative to a reference direction, in particular in a plane, whereby the direction has a deviation relative to the reference direction that is in particular less than 8°, advantageously less than 5°, and particularly advantageously less than 2°. In particular, the connecting piece and/or the tool holder, preferably the output axis, moves in at least one operating state around the drive axis, preferably in a circular motion. In particular, the drive element is intended to move the connecting piece and/or the tool holder, preferably the output axis, in a preferably circular motion about the drive axis of the tool holder.

The term "intended" should be understood to mean specially furnished, specially designed, and/or specially equipped. An object being "intended" for a specific function is understood to mean that the object fulfills and/or executes this specific function in at least one application and/or operating state.

The connecting piece is preferably attached to the drive element so that it can rotate, in particular about the output axis. The sander preferably comprises at least one bearing element. In particular, the connecting piece is mounted on the drive element so that it can rotate via the bearing element, preferably about the output axis. The bearing element is preferably arranged between the drive element and the connecting piece. The bearing element is preferably designed as a radial bearing, in particular as a rolling bearing, e.g. as a ball bearing, or as a plain bearing.

The drive unit is preferably intended to drive the output unit, in particular the tool holder.

The drive unit preferably comprises an electric motor of the like, in particular for driving the drive element.

The sander preferably comprises a housing unit. The housing unit preferably comprises a drive housing to hold the drive unit. The drive housing preferably comprises a fan housing to hold an extraction fan. Preferably, the extraction fan is provided to extract the material removed from the workpiece during machining and, in particular, to blow it out of a dust outlet of the sander. The drive housing preferably comprises the motor housing for holding the drive unit. The fan housing is preferably arranged between the motor housing and the tool holder. The extraction fan is preferably made of metal, in particular cast. Alternatively, however, it is also conceivable that the extraction fan is made of plastic or a combination of plastic and metal.

In particular, the housing unit comprises a handle housing. The bow-shaped handle is preferably a portion of the handle housing. The handle housing preferably comprises two handle housing shells, in particular those specified hereinabove, which are connected to each other, in particular in the separating plane of the handle housing. The handle housing is preferably arranged separately from the drive housing, in particular at a distance from the drive housing. In particular, the handle housing comprises a shell structure, with the two handle housing shells acting as half shells.

The bow-shaped handle preferably comprises a finger grip surface. The bow-shaped handle preferably comprises two walls, in particular side walls, which delimit the finger grip surface, in particular in the main extension plane of the bow-shaped handle and viewed in a direction perpendicular to the drive axis. The bow-shaped handle is preferably designed as a closed bow-shaped handle. Alternatively, however, it is also conceivable that the bow-shaped handle is designed as an open bow-shaped handle. Preferably, the walls define, in particular limit, the handle recess at least partially.

The maximum longitudinal extent of the handle recess preferably extends at least substantially parallel to a tool holder surface of the tool holder. The maximum longitudinal extension of the handle recess preferably extends in the main extension plane of the bow-shaped handle, preferably in a main extension plane of the handle housing, in particular in the separating plane of the handle housing. Preferably, the main extension plane of the bow-shaped handle corresponds to the main extension plane of the handle housing. Alternatively, it is conceivable that the main extension plane of the bow-shaped handle is different from the main extension plane of the handle housing. The separating plane is preferably congruent with the main extension plane of the handle housing and/or the main extension plane of the bow-shaped handle. Alternatively, however, it is also conceivable that the main extension plane of the bow-shaped handle and/or the main extension plane of the handle housing are/is different from the separating plane.

The tool holder surface preferably extends at least substantially perpendicular to the separating plane, the main extension plane of the handle housing, and/or the main extension plane of the bow-shaped handle. The term "substantially perpendicular" can be understood to mean an orientation of a direction relative to a reference direction, whereby, in particular viewed in a projection plane, the direction and the reference direction enclose an angle of 90° and the angle has a maximum deviation of in particular less than 8°, advantageously less than 5°, and particularly advantageously less than 2°.

In particular, the maximum longitudinal extent of the tool holder extends at least substantially parallel to the maximum longitudinal extent of the handle recess and/or the tool holder surface. The maximum longitudinal extension of the tool holder preferably extends along the separating plane of the handle housing, the main extension plane of the handle housing, and/or along the main extension plane of the bow-shaped handle. The maximum longitudinal extension of the tool holder is defined in particular by a maximum longitudinal extension of the tool holder surface. In particular, the tool is intended to be arranged on the tool holder surface.

Preferably, the ratio of the maximum longitudinal extent of the handle recess of the bow-shaped handle to the maximum longitudinal extent of the tool holder is at least 0.38. Preferably, the ratio of the maximum longitudinal extent of the handle recess of the bow-shaped handle to the maximum longitudinal extent of the tool holder is at most 0.42. The ratio of the maximum longitudinal extent of the handle recess of the bow-shaped handle to the maximum longitudinal extent of the tool holder is at least substantially 0.4. The maximum longitudinal extent of the handle recess is preferably at least 50 mm, preferably at least 55 mm and particularly preferably at least 60 mm. The maximum longitudinal extent of the handle recess is preferably at most 80 mm, preferably at most 70 mm, and particularly preferably at most 75 mm. Particularly preferably, the maximum longitudinal extent of the handle is at least substantially 61 mm. Alternatively, however, it is also conceivable that the maximum longitudinal extent of the handle recess is greater than 80 mm or less than 50 mm.

In particular, the handle housing comprises a palm grip, in particular a grip knob. The palm grip is preferably arranged such that the drive axis intersects the palm grip. The bow-shaped handle merges into the palm grip in particular. In particular, the fan housing is located between the tool holder and the palm grip. The handle housing, in particular the palm grip, surrounds the motor housing, preferably at least in a plane perpendicular to the drive axis.

The sander preferably comprises the battery pack interface for electrical and/or mechanical connection to a battery pack. In particular, the battery pack interface comprises guidance means, e.g. one or multiple guide rails or the like, for guiding the battery pack during assembly and/or disassembly at the battery pack interface. The battery pack interface, in particular the guidance means, preferably specifies an insertion direction for the battery pack when the battery pack is mounted on the battery pack interface. The insertion direction preferably extends at least substantially perpendicular to the drive axis, to the separating plane, to the main extension plane of the bow-shaped handle, and/or to the main extension plane of the handle housing. In particular, the insertion direction extends at least substantially parallel to the tool holder surface. Preferably, the battery pack interface is arranged on the handle housing, in particular on a side of the bow-shaped handle facing away from the palm grip. In particular, the battery pack interface has no interface with the drive axis and/or a main extension plane of the tool holder surface.

Preferably, the handheld power tool, in particular the sander, comprises at least one input element. Preferably, the handheld power tool can be switched on and/or off by the operator actuating the input element. Alternatively or additionally, it is conceivable that the input element can be used to adjust the rotational speed of the handheld power tool or the like. The input element can, e.g., be designed as a button, a rotary wheel, a switch, or the like. The input element is, e.g., arranged on the palm grip, preferably on a side of the palm grip facing away from the battery pack interface, the tool holder, and/or the bow-shaped handle.

The sander is preferably intended for one-handed operation, in particular by means of the bow-shaped handle and the palm grip. Alternatively, however, it is also conceivable that the sander is designed as a two-handed guide, in which case one hand of the operator is arranged on the palm grip and one on the bow-shaped handle.

In one aspect of the invention, which can be considered in particular on its own as well as in conjunction with other aspects of the invention, the invention is based on a hand-held power tool device, in particular a hand-held sander device, for a handheld power tool, in particular a sander, preferably the sander specified hereinabove, comprising a housing unit, in particular the housing unit specified hereinabove, which comprises at least one handle housing, in particular the handle housing specified hereinabove, and a drive housing, in particular the drive housing specified hereinabove, which is coupled to the handle housing. It is proposed that the drive housing comprises, on a surface of an upper side of the drive housing, a center bar which is raised relative to the surface and above which, in particular, one end of the handle housing is arranged, whereby the center bar slopes down onto the surface in both directions, starting from a main extension plane of the handle housing, in particular the main extension plane of the handle housing specified hereinabove, and perpendicular to the main extension plane of the handle housing.

Advantageously, a design of the drive housing with such a center bar enables a particularly space-saving design of the handheld power tool device, in particular with regard to the overall height of the handheld power tool. A particularly large gripping surface can be realized on the handle housing. Contact between an operator's fingers and the drive housing can be efficiently counteracted in an advantageous manner. The operator can be protected particularly efficiently against vibrations. A particularly high level of operating convenience can be achieved in an advantageous manner. Particularly precise and/or safe guidance of the handheld power tool can be achieved.

The center bar stands out in particular from the adjacent surface. A maximum transverse extent of the center bar is preferably smaller than a maximum overall transverse extent of the handle housing. The maximum transverse extent of the center bar preferably extends at least substantially perpendicular to the main extension plane of the bow-shaped handle, the main extension plane of the handle housing, the separating plane, and/or the drive axis. In particular, the maximum transverse extent of the center bar extends at least substantially parallel to the tool holder surface of the tool holder. The maximum transverse extent of the center bar is preferably smaller than a maximum transverse extent of the handle housing at the end of the center bar arranged above the center bar. The end of the handle housing is arranged above the center bar, particularly in relation to the tool holder and/or the surface.

The center bar preferably comprises a main extension axis. A "main extension axis" of an object can be understood in particular as an axis that extends parallel to a longest edge of a smallest geometric cuboid that just completely encloses the object, and in particular extends through the center of the cuboid. In particular, the main extension axis of the center bar extends at least substantially perpendicular to the drive axis and/or to the maximum transverse extent of the center bar. In particular, the main extension axis of the center bar extends at least substantially parallel to the main extension plane of the bow-shaped handle, to the main extension plane of the handle housing, to the separating plane, and/or to the tool holder surface. Preferably, the main extension axis of the center bar extends along the main extension plane of the bow-shaped handle, along the main extension plane of the handle housing, and/or along the separating plane.

The center bar extends, preferably at least in the direction of the main extension axis of the center bar, in particular over a large portion of the surface, preferably over at least 50%, preferably over at least 75% and particularly preferably over 90% of the surface. The upper side, preferably the surface, is arranged facing away from the tool holder. The center bar has a curvature, preferably a curvature adapted to the surface, particularly in the longitudinal direction, preferably in the direction of the main extension axis of the center bar. Alternatively, however, it is also conceivable that the center bar is designed without a curvature in the longitudinal direction.

In one aspect of the invention, which can be considered in particular on its own as well as in conjunction with other aspects of the invention, the invention is based on a handheld power tool system with a sander, in particular the sander specified hereinabove, preferably an orbital sander or a random orbital sander, and with a battery pack for supplying power to the sander. It is proposed that the handheld power tool system comprises a support unit which is designed for placing and/or storing the sander on a base in at least one placement and/or storage position, whereby the battery pack comprises a support surface of the support unit for the at least one placement and/or storage position.

The battery pack can be used to ensure that the sander stands securely. An operator can conveniently park the sander. An operator can park or set down the sander via the battery pack for cleaning, maintenance or the like of the handheld power tool and/or a tool arranged on the sander. A particularly high level of operating convenience can be achieved.

It is conceivable that a support point or a support line forms the support surface. It is also conceivable that the support surface comprises multiple support points, in particular at a distance from one another. Preferably, the support surface is a continuous surface that rests on the base, particularly in the at least one placement and/or storage position. The base can be a floor, a table, or the like. In particular, the battery pack comprises a battery pack housing. The battery pack housing comprises the contact surface.

It is conceivable that the support unit is designed for placing and/or storing the sander on the work surface in at least one further placement and/or storage position. For example, the battery pack comprises a further support surface of the support unit for the at least one further placement and/or storage position. It is also conceivable that the housing unit, in particular the handle housing and/or the drive housing, comprises at least one additional support surface for the placement and/or storage position and/or for the at least one further placement and/or storage position.

In one aspect of the invention, which can be considered in particular on its own as well as in conjunction with other aspects of the invention, the invention is based on a protective device, in particular a wall protection ring, for collision protection of a tool, in particular the tool(s) specified hereinabove, which can be arranged on the handheld power tool and/or a tool holder, in particular a sanding pad, of the handheld power tool with objects in a working environment of the handheld power tool. It is proposed that the protective device comprises a shutter unit and/or a light guide unit for at least one light source.

Particularly efficient and/or precise illumination of a workpiece to be processed by the handheld power tool can be achieved in an advantageous manner. Such a design of the handheld power tool device can counteract blinding of the operator. Advantageously, a particularly high level of operating comfort and/or safety can be achieved.

The protective device is designed in particular as a protective ring. The protective device is preferably intended as a bumper for the handheld power tool. In particular, the protective device is intended to counteract an impact of the tool holder and/or the tool arranged on the tool holder against walls or the like in the working environment. The protective device is preferably arranged on the drive housing in at least one operating state. Preferably, the protective device is intended for arrangement on the fan housing.

The shutter unit is in particular intended to shield an region from the incidence of light from the at least one light source. The shutter unit comprises, e.g., at least one shutter element. Alternatively, however, it is also conceivable that the shutter unit comprises multiple shutter elements. The shutter element is preferably an opaque component. It is conceivable that the shutter element is designed as a reflector, e.g. as a mirror or the like.

The protective device preferably comprises a base body. It is conceivable that the shutter unit, in particular the at least one shutter element, is designed to be integral with the base body. It is conceivable that the shutter unit, in particular the at least one shutter element, is formed by the base body of the protective device. Alternatively, it is also conceivable that the shutter unit, in particular the at least one shutter element, is designed to be separate from the base body. In particular, it is conceivable that the shutter unit, preferably the at least one shutter element, can be attached to the base body, preferably detachably. In this context, the term "detachable" is in particular understood to mean "non-destructively separable". It is also conceivable that the shutter unit, in particular the at least one shutter element, can be arranged adjustably on the base body, preferably in order to adapt a shielding region by the shutter unit.

The light guide unit is preferably arranged on the base body and/or the shutter unit. For example, the light guide unit comprises at least one light guide element and preferably multiple light guide elements. In particular, the light guide unit is intended to guide and/or emit light from the at least one light source. The at least one light guide element is, e.g., designed as a transparent fiber, tube, or rod. It is also conceivable that the light guide unit comprises at least one emitting element, in particular a light-scattering element, e.g. in the form of a roughening, a scattering glass, plastic or ceramic plate, a scattering plastic film, or the like. The radiating element is preferably arranged on the base body and/or the shutter unit. It is also conceivable that the radiating element is a portion of the light guide element or forms the light guide element.

The at least one light source is, e.g., a portion of the handheld power tool, in particular the sander. Alternatively or additionally, however, it is also conceivable that the light source is a portion of the protective device. The light source is, e.g., designed as an LED, an incandescent lamp, or another light source that a skilled person considers useful.

In one aspect of the invention, which can in particular be considered independently of further aspects of the invention, it is proposed that a center of gravity of the sander is arranged in the handle recess of the bow-shaped handle. A particularly high level of comfort can be achieved when handling handheld power tools. A particularly favorable weight distribution can be achieved in an advantageous manner. Particularly favorable ergonomic properties can be achieved. Preferably, the center of gravity is arranged within the handle recess at least in a direction perpendicular to the main extension plane of the handle housing, in particular to the main extension plane of the handle housing, when viewed from within the handle recess. A minimum distance of the center of gravity from the separating plane of the handle housing, from the main extension plane of the handle housing and/or from the main extension plane of the bow-shaped handle is preferably smaller than a maximum transverse extent of the handle housing, in particular of the bow-shaped handle, starting from the separating plane of the handle housing, the main extension plane of the handle housing, or the main extension plane of the bow-shaped handle. It is also conceivable that the center of gravity is arranged in the separating plane of the handle housing, in the main extension plane of the handle housing, and/or in the main extension plane of the bow-shaped handle. The maximum transverse extent of the handle housing, in particular of the bow-shaped handle, preferably starting from the separating plane of the handle housing, the main extension plane of the handle housing, and/or the main extension plane of the bow-shaped handle, preferably extends at least substantially perpendicular to the main extension plane of the bow-shaped handle, in particular to the main extension plane of the handle housing, the separating plane, and/or to the drive axis. The maximum transverse extent of the handle housing, in particular of the bow-shaped handle, preferably starting from the separating plane of the handle housing, the main extension plane of the handle housing, and/or the main extension plane of the bow-shaped handle, preferably extends at least substantially parallel to the tool holder surface.

It is further proposed that a ratio of a maximum distance of the tool holder from the center of gravity in the direction of the drive axis to a minimum distance between the drive axis and the center of gravity is at least 2.8 and at most 3.5. Advantageously, a particularly favorable weight distribution can be achieved with regard to handling and/or guiding the handheld power tool. A particularly high level of operating comfort and/or particularly favorable ergonomic properties of the sander can be achieved in an advantageous manner. Preferably, the ratio of the maximum distance of the tool holder from the center of gravity in the direction of the drive axis to the minimum distance between the drive axis and the center of gravity is at least 3.0, particularly preferably at least 3.1. Preferably, the ratio of the maximum distance of the tool holder from the center of gravity in the direction of the drive axis to the minimum distance between the drive axis and the center of gravity at most 3.2. The maximum distance between the tool holder and the center of gravity in the direction of the drive axis is defined in particular by a maximum distance between the tool holder surface and the center of gravity in the direction of the drive axis. The maximum distance between the tool holder and the center of gravity in the direction of the drive axis is in particular at least 30 mm, preferably at least 33 mm, preferably at least 35 mm. The maximum distance between the tool holder and the center of gravity in the direction of the drive axis is in particular at most 50 mm, preferably at most 45 mm, and particularly preferably at most 40 mm. For example, the maximum distance between the tool holder and the center of gravity in the direction of the drive axis is at least substantially 38 mm. Alternatively, however, it is also conceivable that the maximum distance between the tool holder and the center of gravity in the direction of the drive axis is less than 30 mm or greater than 50 mm. The minimum distance between the drive axis and the center of gravity is at least 8 mm, preferably at least 10 mm. The minimum distance between the drive axis and the center of gravity is at most 20 mm, preferably at most 15 mm. For example, the minimum distance of the drive axis to the center of gravity is at least substantially 12 mm. Alternatively, however, it is also contemplated that the minimum distance of the drive axis to the center of gravity is less than 8 mm or greater than 20 mm. In particular, the drive axis extends at least substantially perpendicular to the tool holder surface. The drive axis extends in particular at least substantially parallel to the main extension plane of the handle housing, in particular to the main extension plane of the bow-shaped handle, and/or to the separation plane. It is conceivable that the drive axis extends in the main extension plane of the handle housing, in the main extension plane of the bow-shaped handle, and/or in the separating plane. The minimum distance between the drive axis and the center of gravity is at least substantially perpendicular to the drive axis. The minimum distance between the drive axis and the center of gravity extends in particular at least substantially parallel to the tool holder surface, to the main extension plane of the handle housing, to the main extension plane of the bow-shaped handle, and/or to the separating plane.

It is also proposed that a maximum height of the sander in the direction of the drive axis has a ratio of at least 2.8 and at most 3.2 to a maximum distance between the tool holder and the center of gravity in the direction of the drive axis, in particular the maximum distance specified hereinabove. The center of gravity of the handheld power tool is particularly low in relation to the maximum height of the sander. Advantageously, a particularly favorable weight distribution and/or particularly favorable ergonomic properties can be achieved with regard to handling and/or guiding the handheld power tool. A particularly high level of operating convenience can be achieved. A particularly high stability of the sander can be achieved in an advantageous manner. The ratio of the maximum height of the sander in the direction of the drive axis to the maximum distance between the tool holder and the center of gravity in the direction of the drive axis is preferably at least 3.0. The ratio of the maximum height of the sander in the direction of the drive axis to the maximum distance between the tool holder and the center of gravity in the direction of the drive axis is preferably 3.1 or less. The maximum height of the sander in the direction of the drive axis preferably extends from the tool holder surface parallel to the drive axis to an outermost point of the handle housing. The maximum height of the sander is preferably at least 100 mm, preferably at least 110 mm. The maximum height of the sander is preferably at most 130 mm, preferably at most 120 mm. Alternatively, however, it is also conceivable that the maximum height of the sander towards the drive axis is less than 110 mm or greater than 130 mm. A ratio of the maximum height of the sander to a maximum height of the handle recess in a direction parallel to the drive axis is preferably at least 4.0, preferably at least 4.3, particularly preferably at least 4.4, and at most 5.0, preferably at most 4.7, particularly preferably at most 4.6. The maximum height of the handle recess is preferably between 20 mm and 30 mm, preferably between 24 mm and 28 mm and particularly preferably at least substantially 26 mm.

It is further proposed that the handle recess of the bow-shaped handle is closed, preferably substantially oval closed. The fingers of the operator can be protected particularly efficiently in an advantageous manner. Advantageously, the handle housing can be additionally supported by the closed bow-shaped handle. A particularly high stability of the handheld power tool can be achieved in an advantageous manner. In particular, the handle recess is closed when viewed in the main extension plane of the bow-shaped handle, in the main extension plane of the handle housing, and/or in the separating plane. The handle recess is closed in particular by walls of the drive housing, in particular the fan housing of the drive housing, and the handle housing. Alternatively, it is conceivable that the handle recess is completely closed by the walls of the handle housing. The handle recess preferably has an oval shape, in particular when viewed in a direction perpendicular to the main extension plane of the bow-shaped handle, preferably to the main extension plane of the handle housing. Alternatively, however, it is also conceivable that the handle recess has a rectangular shape, a square shape, a circular shape, or any other shape that a skilled person considers useful, in particular when viewed in the direction perpendicular to the main extension plane of the bow-shaped handle, preferably to the main extension plane of the handle housing.

It is further proposed that the battery pack has a battery pack center of gravity which, in a state arranged on the sander, is offset from the main extension plane of the bow-shaped handle. Design-related shifts in the center of gravity of the sander in relation to the main extension plane of the bow-shaped handle can be compensated for. A handheld power tool system with a particularly favorable weight distribution can be provided. A particularly ergonomic handheld power tool system can be provided in an advantageous manner. A particularly high level of operating convenience can be achieved. A minimum distance of the battery pack center of gravity from the separating plane of the handle housing, from the main extension plane of the handle housing, and/or from the main extension plane of the bow-shaped handle is preferably smaller than the maximum transverse extent of the handle housing, in particular of the bow-shaped handle, starting from the separating plane of the handle housing, the main extension plane of the handle housing, or the main extension plane of the bow-shaped handle. In particular, the minimum distance of the battery pack center of gravity from the separating plane of the handle housing, from the main extension plane of the handle housing, and/or from the main extension plane of the bow-shaped handle is less than 20 mm, preferably less than 15 mm, and preferably less than 10 mm.

It is also proposed that the sander comprises a dust outlet, in particular the dust outlet specified hereinabove, whereby the battery pack center of gravity and the dust outlet are arranged on different sides of the main extension plane of the bow-shaped handle. Advantageously, an eccentric displacement of the center of gravity with respect to the main extension plane of the bow-shaped handle can be minimized by the battery pack or the dust outlet and compensated for in a particularly advantageous manner. Advantageously, a sander with a particularly high level of handling comfort can be provided. For example, the center of gravity of the sander and the center of gravity of the battery pack are located on different sides of the main extension plane of the bow-shaped handle. The dust outlet is located in particular on the drive housing, preferably on the fan housing. The dust outlet is arranged in particular on one side of the separating plane, the main extension plane of the bow-shaped handle, and/or the main extension plane of the handle housing. Preferably, the handheld power tool system comprises a dust collection container, e.g. a dust box, a dust bag, or the like. An overall center of gravity of the handheld power tool system relates in particular to the handheld power tool, preferably the sander comprising the battery pack and preferably has no dust collection container and/or protective device. Preferably, the dust collection container can be attached to the dust outlet, in particular detachably, e.g. by means of a screw connection, a latching connection, or the like. Alternatively, it is also conceivable that at least one dust outlet connecting piece of the dust collection container is designed to be integral with the dust outlet. Preferably, the dust collection container is rotatably mounted on the dust outlet. Alternatively, however, it is also conceivable that the dust collection container can be connected to the dust outlet in a rotationally fixed manner. The dust collection container is in particular intended to collect dust and/or debris, preferably extracted by the extraction fan. Alternatively or additionally, it is conceivable that the dust outlet can be coupled to an active extraction device, e.g. a vacuum cleaner, particularly in the case of a handheld power tool that is designed without an extraction fan. It is also conceivable that the dust collection container can be compressed by contact with the work surface when the handheld power tool is put in the placement and/or storage position, in particular to enable the handheld power tool to be put in the placement and/or storage position. Alternatively or additionally, it is also conceivable that the dust collection container can be displaced in the direction of the dust outlet, in particular displaced relative to the dust outlet via contact with the work surface when the handheld power tool is in the placement and/or storage position.

It is further proposed that a ratio of a minimum distance between the center of gravity of the battery pack in a state arranged on the sander and the drive axis of the drive unit to the maximum longitudinal extent of the tool holder is at least 0.85 and at most 1.2. Advantageously, a particularly favorable weight distribution can be achieved with regard to handling and/or guiding the handheld power tool. A particularly high level of operating convenience can be achieved. The minimum distance between the center of gravity of the battery pack in a state arranged on the sander and the drive axis extends in particular at least substantially parallel to the tool holder surface, the main extension plane of the bow-shaped handle, the main extension plane of the handle housing, and/or the separating plane. The minimum distance between the center of gravity of the battery pack in a state arranged on the sander and the drive axis is at least substantially perpendicular to the drive axis. For example, the minimum distance between the center of gravity of the battery pack and the drive axis is at least substantially 136 mm for a battery pack with 4 Ah electrical charge capacity, at least substantially 148 mm for a battery pack with 8 Ah electrical charge capacity and at least substantially 160 mm for a battery pack with 12 Ah electrical charge capacity. Alternatively, however, other values for the minimum distance between the center of gravity of the battery pack and the drive axis are also conceivable, in particular depending on the weight of the battery pack.

It is further proposed that an overall center of gravity of the handheld power tool system, in particular the one specified hereinabove, is arranged in the handle recess of the bow-shaped handle. A particularly high level of comfort can be achieved when handling handheld power tools. A particularly favorable weight distribution can be achieved in an advantageous manner. A minimum distance of the overall center of gravity from the separating plane of the handle housing, from the main extension plane of the handle housing, and/or from the main extension plane of the bow-shaped handle is preferably smaller than the maximum transverse extent of the handle housing, in particular of the bow-shaped handle, starting from the separating plane of the handle housing, the main extension plane of the handle housing, and/or the main extension plane of the bow-shaped handle. Preferably, the overall center of gravity is arranged in the separating plane of the handle housing, in the main extension plane of the handle housing, and/or in the main extension plane of the bow-shaped handle. Preferably, the overall center of gravity of the handheld power tool system is arranged at least with a battery pack with a single-layer battery cell arrangement within the handle recess of the bow-shaped handle. Preferably, the position of the overall center of gravity of the handheld power tool system with a battery pack with a single-layer battery cell arrangement is such that the handheld power tool can be placed on the tool holder, in particular without tilting.

A minimum distance between the drive axis and the overall center of gravity has a value of at least 55 mm to at least 70 mm, in particular depending on the weight of the battery pack. The minimum distance between the drive axis and the overall center of gravity has a value of at most 65 mm to at most 75 mm, depending in particular on the weight of the battery pack. A maximum distance of the tool holder to the overall center of gravity in the direction of the drive axis has a value of at least 45 mm to at least 50 mm, in particular depending on the weight of the battery pack. The maximum distance between the tool holder and the overall center of gravity in the direction of the drive axis has a value of at most 52 mm to at most 55 mm, depending in particular on the weight of the battery pack.

It is further proposed that a ratio of the minimum distance between the center of gravity of the battery pack in a state arranged on the sander and the drive axis of the drive unit to the maximum longitudinal extent of the handle recess of the bow-shaped handle is at least 2.0 and at most 3.0. Advantageously, particularly precise and/or controlled handling of the sander can be achieved in an advantageous manner. Particularly safe and/or precise working with the sander can be achieved in an advantageous manner. A handheld power tool system with particularly favorable ergonomic properties can be provided in an advantageous manner.

It is also proposed that the handle housing at least partially covers the center bar on both sides in directions perpendicular to the main extension plane of the handle housing. A particularly large gripping surface can be provided for the operator in an advantageous manner. The operator can be prevented from coming into contact with the drive housing when using the handheld power tool device. A particularly high level of operating convenience can be achieved in an advantageous manner. The handle housing covers the center bar on both sides in the directions perpendicular to the main extension plane of the handle housing, in particular at a height of at least 10%, preferably at least 20%, and preferably at least 30%. The center bar is not covered by the handle housing, particularly in the longitudinal direction. It is also conceivable that the handle housing largely covers the center bar on both sides at a height in the directions perpendicular to the main extension plane of the handle housing, in particular at least 50%, preferably at least 70%, and preferably at least 90%.

It is also proposed that an end of the handle housing facing the center bar, preferably the end already specified hereinabove, in particular an end surrounding the drive housing in a substantially ring-like manner, is arranged at a distance from the drive housing, in particular at a radial and axial distance, preferably with respect to the drive axis. A particularly large grip region can be made provided to the operator in an advantageous manner. The operator can be prevented from coming into contact with the drive housing when using the handheld power tool device. A particularly high level of operating convenience can be achieved in an advantageous manner. Preferably, the end is arranged at a distance from the surface. Preferably, the end surrounds the motor housing of the drive housing like a ring. In particular, the motor housing is arranged on the center bar. The motor housing is preferably arranged on a side of the center bar facing away from the tool holder, in particular above the center bar with respect to the tool holder. The motor housing is preferably enclosed by the handle housing in a plane perpendicular to the drive axis. Preferably, the motor housing is at least substantially completely enclosed by the handle housing in the radial direction starting from the drive axis. The phrase "at least substantially complete" can be understood at least 50%, preferably at least 75%, and particularly preferably at least 90% of a total volume and/or a total mass of an object. Preferably, the motor housing is designed to be at least partially integral with the center bar. The term "at least one unit or object and at least one further unit or object are designed to be at least partially integral with one another" is in particular understood to mean that at least one element of the unit or object is designed to be integral with at least one further element of the further unit or object. The term "integral" can be understood to mean at least connected in a bonded manner, e.g. by a welding process, a soldering process, a bonding process, an injection molding process, and/or another process that a skilled person considers useful, and/or advantageously designed in one piece, e.g. by production from a casting and/or by production in a single or multi-component injection molding process and advantageously from a single blank. The handle housing, in particular the end of the handle housing, is preferably arranged at a distance from the drive housing, in particular the motor housing.

It is further proposed that the end of the handle housing facing the center bar is adapted to the shape of the drive housing, in particular the center bar and/or the surface. A particularly large gripping surface for an operator can be achieved in an advantageous manner, along with a particularly small space requirement. Preferably, said end comprises two recesses for the center bar. It is conceivable that the end is at a constant distance from the drive housing in the direction of the drive axis. Alternatively, however, it is also conceivable that the distance between the end and the drive housing varies in the direction of the drive axis.

It is also proposed that the center bar comprises a holder for a user interface and/or a communication module. A particularly space-saving arrangement of a user interface can be achieved in an advantageous manner. The functionality of the handheld power tool device can be extended to save space in an advantageous manner. Particularly protected and secure positioning of a user interface can be achieved in an advantageous manner. The holder is preferably designed as a recess in the center bar. The user interface comprises, e.g., one or multiple input elements. The input element of the user interface can, for example, be designed as a button, a rotary wheel, a switch, or the like. For example, the handheld power tool can be switched on and/or off via the user interface, in particular via the at least one input element of the user interface, and/or a rotational speed of the handheld power tool, preferably the sander, can be adjusted or the like. It is conceivable that the user interface comprises one or multiple output elements, e.g. a display, a light element, in particular an LED, or the like. For example, the user interface, in particular the at least one output element, can be used to output the rotational speed of the handheld power tool, preferably the sander, a charge status of the battery pack, a device status of the handheld power tool, or the like. Preferably, the user interface is connected via data technology to a control unit of the handheld power tool, in particular the sander, preferably by in a wired and/or wireless manner. The control unit is intended in particular for controlling the drive unit. In particular, the control unit comprises at least one processor and one memory element, as well as an operating program stored on the memory element. The memory element is preferably designed as a digital storage medium, e.g. a hard disk or the like. The holder is preferably arranged on a side of the motor housing facing away from the bow-shaped handle. In particular, the holder is arranged on a side of the handle housing facing away from the battery pack interface of the handheld power tool. In particular, the communication module is configured to communicate with another device, e.g. a smartphone, a laptop, a server, a cloud, a gateway, or the like. Preferably, the communication module is connected to the control unit and/or the user interface using data technology, in particular in a wireless and/or by wired manner. It is conceivable that the communication module is a portion of the user interface. Alternatively, however, it is also conceivable that the communication module is designed and/or arranged to be separate from the user interface. For example, it is conceivable that the communication module is arranged in the handle housing, in particular in the bow-shaped handle. It is also conceivable that the communication module is a portion of the control unit. The communication module can comprise one or multiple data transmission technologies, e.g. Bluetooth, NFC, or the like. The control unit is preferably located in the handle housing.

In one aspect of the invention, which can in particular be considered independently of further aspects of the invention, it is proposed that the drive housing comprises at least one air outlet opening which is at least partially covered by the handle housing, in particular when viewed at least in a main outlet direction of the air outlet opening. A particularly favorable exhaust air flow can be achieved in an advantageous manner. Advantageously, the operator can be protected from exhaust air particularly efficiently and/or in a structurally simple manner. A particularly high level of operating convenience can be achieved in an advantageous manner. Preferably, the air outlet opening is at least partially covered by the handle housing, at least when viewed in a plane perpendicular to the drive axis. It is conceivable that the handle housing covers at least most of the air outlet opening, preferably at least 50%, preferably at least 75% and particularly preferably at least 90%, in particular when viewed in a plane perpendicular to the drive axis. It is also conceivable that the handle housing completely covers the air outlet opening, particularly when viewed in a plane perpendicular to the drive axis. The main outlet direction is determined by the arrangement and/or geometry of the air outlet opening. For example, the main outlet direction extends at least substantially perpendicular to the drive axis and/or at an angle to the drive axis, preferably inclined in the direction of the tool holder. The air outlet opening is preferably covered by the end of the handle housing, in particular when viewed in a plane perpendicular to the drive axis. Preferably, the air outlet opening is arranged above the center bar, preferably in relation to the tool holder and/or the surface.

It is further proposed that the drive housing comprises a motor housing, in particular the motor housing specified hereinabove, which is arranged on the center bar and comprises the air outlet opening. The hot engine exhaust air can be efficiently dissipated while at the same time providing particularly efficient protection for the operator from the engine exhaust air. A handheld power tool device with a particularly high level of operating convenience can be provided. The motor housing preferably comprises a plurality of air outlet openings. The air outlet openings are, e.g., arranged at a distance from each other in a circumferential direction, which in particular extends in a plane perpendicular to the drive axis.

It is also proposed that an opening is formed between the end of the handle housing facing the center bar and the drive housing to allow air to escape from the air outlet opening. The hot engine exhaust air can be efficiently dissipated while at the same time providing particularly efficient protection for the operator from the engine exhaust air in an advantageous manner. A handheld power tool device with a particularly high level of operating convenience can be provided. The opening is preferably arranged opposite the upper side. The opening is in particular formed by arranging the end of the handle housing at a distance from the drive housing, preferably the motor housing.

In one aspect of the invention, which can in particular be considered independently of further aspects of the invention, it is proposed that the drive housing comprises a closed cable channel. Efficient protection for a cable connection can be advantageously provided. A particularly space-saving and/or protected arrangement of a cable connection can be achieved in an advantageous manner. It is conceivable that at least a part, in particular a large part, preferably at least 50%, preferably at least 70%, of the cable channel is enclosed by the handle housing, in particular when viewed in a plane perpendicular to the drive axis. An open end of the cable channel is preferably arranged on the holder. A further open end of the cable channel is preferably arranged in an inner region of the handle housing. In particular, the cable channel extends from the holder to the inside of the handle housing. The cable channel extends over the entire motor housing, for example, particularly in the direction of the drive axis. Preferably, the handheld power tool, in particular the sander and/or the handheld power tool device comprises an electrical connection unit. In particular, the electrical connection unit comprises at least one electrical connection element, e.g. a cable. The electrical connection unit, in particular the electrical connection element, is preferably intended to connect the user interface to the control unit, in particular at least in terms of data technology and/or control technology. Preferably, the user interface can be supplied with electrical energy via the electrical connection unit, preferably via the at least one electrical connection element and/or a further electrical connection element of the electrical connection unit. The electrical connection unit, in particular the at least one electrical connection element and/or the further electrical connection element, is/are arranged in the cable channel. The holder preferably comprises at least one electrical connection for the user interface and/or the communication interface. At least the electrical connection element and/or the further electrical connection element is/are connected to the connection.

It is also proposed that the drive housing comprises at least two housing shells, between which the cable channel is arranged. Advantageously, it is particularly easy to install a cable connection in the cable channel. Advantageously, a closed cable channel can be provided in a simple design and, in particular, with a particularly high level of convenience when installing a cable connection. In particular, the drive housing has a shell design, with the two housing shells acting as half shells. The two housing shells of the drive housing are preferably connected to each other in a drive housing separating plane of the drive housing. The drive housing separating plane preferably extends at least substantially parallel to the separating plane of the handle housing. It is conceivable that the drive housing separating plane corresponds to the separating plane of the handle housing. Alternatively, however, it is also conceivable that the drive housing separating plane extends at an angle to the separating plane. Preferably, the cable channel extends inside the outer walls of the housing shells, in particular inside at least one outer wall of one of the housing shells. Preferably, the cable channel connects to a contact surface of the outer walls of the two housing shells.

It is also proposed that one housing shell of the housing shells forms a groove for the cable channel and another housing shell of the housing shells forms a cover for the cable channel. A closed cable channel with a simple design can be provided in a structurally advantageous manner.

It is further proposed that the cable channel is arranged at least partially on, in particular in, the center bar. A closed cable channel can be achieved in a particularly space-saving and advantageous manner. It is conceivable that at least a portion of the cable channel extends through the center bar, e.g. at least 5%, 10%, or 20% of the cable channel.

Further proposed in particular is a handheld power tool, in particular the handheld sander specified hereinabove, preferably the sander specified hereinabove comprising the handheld power tool device. A handheld power tool with a particularly low overall height can be provided in an advantageous manner. A handheld power tool with particularly favorable handling characteristics, in particular a particularly large gripping surface for the operator, can be provided.

It is also proposed that the sander comprises a tool holder, in particular the tool holder specified hereinabove for holding a tool, in particular the tool specified hereinabove, whereby the tool holder and/or the tool are/is at a distance from the work surface in the at least one placement and/or storage position. Advantageously, an excessive load on the tool holder and/or the tool in the at least one placement and/or storage position of the sander can be counteracted. Damage to the tool holder and/or the tool, in particular by the work surface, can be counteracted. It is possible to conveniently replace the tool. A particularly high level of operating convenience can be achieved, in particular when replacing tools and/or performing maintenance work or the like on the tool holder.

It is further proposed that the sander can be placed in the at least one placement and/or storage position solely via the support surface. It is advantageous to counteract the formation of signs of wear caused by contact between the sander, in particular the housing unit, and the work surface. The sander can be placed particularly gently in an advantageous manner. Preferably, the sander is at a distance from the work surface in the at least one placement and/or storage position. In particular, the sander is connected to the work surface via the battery pack in the at least one placement and/or storage position, and can preferably be placed on the work surface. In the at least one placement and/or storage position, only the contact surface on the battery pack is in contact with the work surface.

It is further proposed that a main extension plane of the supporting surface extends at an angle other than 90° to a main extension plane of the tool holder surface of the tool holder of the sander. Advantageously, a particularly favorable weight distribution can be achieved when placing the sander down. Particularly safe placement of the sander can be achieved in an advantageous manner. By tilting the tool holder surface in this way, the tool can be mounted and removed particularly conveniently in the placement and/or storage position of the sander. A particularly high level of user comfort can be achieved in an advantageous manner. In particular, a main extension axis of the handheld power tool, in particular the sander, extends at an angle other than 90° to the main extension plane of the support surface. It is conceivable that the tool holder surface extends at least substantially parallel to the main extension axis of the handheld power tool, in particular the sander. In particular, a handle axis of the handle housing extends at an angle other than 90° to the main extension plane of the support surface in the placement and/or storage position. The handle axis is defined in particular by the bow-shaped handle. The handle axis preferably extends in the separating plane and/or in the main extension plane of the handle housing, in particular in the main extension plane of the bow-shaped handle. The handle axis corresponds in particular to a main extension axis of a handle tube of the bow-shaped handle.

It is also proposed that the main extension plane of the tool holder surface and the main extension plane of the supporting surface include an angle which is greater than 80°. Advantageously, the sander can be placed in a particularly safe and space-saving manner. Preferably, the angle enclosed by the main extension plane of the tool holder surface and the main extension plane of the supporting surface has a value of less than 90° and greater than 80°. In particular, the tool holder, preferably the tool holder surface, is inclined in a direction away from the work surface in the placement and/or storage position. Particularly preferably, the angle enclosed by the main extension plane of the tool holder surface and the main extension plane of the supporting surface has a value of at least substantially 86°.

It is further proposed that a normal of the main extension plane of the support surface intersects the battery pack and a center of gravity of the sander. Advantageously, the sander can be placed. in a particularly stable manner. Preferably, the normal of the main extension plane of the support surface intersects a geometric center of the support surface and/or the battery pack center of gravity, in particular at least a nearby region of the geometric center of the support surface and/or a nearby region of the battery pack center of gravity. In this context, the term "nearby region" is in particular context understood to mean a range that is at a maximum distance from a reference point that is preferably less than 7%, preferably less than 5%, of a maximum longitudinal extent of the battery pack.

It is also proposed that one edge of the battery pack housing of the battery pack forms the contact surface. Advantageously, the sander can be placed on the base in a particularly stable manner. Preferably, an edge of the battery pack housing facing away from the tool holder forms the contact surface. Preferably, the support surface and a support point of the sander span a support plane of a, in particular further placement and/or storage position of the support unit.

It is also proposed that a main extension axis of the battery pack extends at least substantially perpendicular to the main extension axis of the sander. Advantageously, the sander can be placed on the work surface in a particularly stable manner. Preferably, the edge of the battery pack housing extends at least substantially perpendicular to the main extension axis of the handheld power tool.

It is further proposed that the sander comprises only one support point, in particular the one specified hereinabove, which comes to rest in a support plane, in particular the one specified hereinabove, of an in particular further placement and/or storage position of the support unit, in particular the one specified hereinabove. Advantageously, wear on the sander, in particular the housing unit, can be minimized during contact with the work surface, in particular at a quite high level of stability during placement of the sander. The support point is preferably located on the handle housing or the drive housing. The contact point is preferably located on a surface of the palm grip. The palm grip preferably has a round shape. The surface of the palm grip, on which the support point is arranged, is preferably curved. Alternatively, however, it is also conceivable that the surface of the palm grip on which the support point is arranged is flat. The support point of the sander is preferably arranged on a side of the handle housing facing away from the tool holder. Alternatively, however, it is also conceivable that at least one support elevation is arranged on the palm grip, which comes to rest in the support plane of the at least one, in particular further placement and/or storage position. The at least one support elevation is intended in particular to form a support line for placement of the handheld power tool. The support elevation is, e.g., designed as an elongated bar whose main extension axis extends at least substantially perpendicular to the main extension axis of the handheld power tool, to the separating plane, to the main extension plane of the bow-shaped handle, and/or to the main extension plane of the handle housing. Furthermore, it is also conceivable that the palm grip comprises at least two support elevations, preferably in a direction perpendicular to the separating plane, which are at a distance from each other and designed as humps or the like and which are preferably situated in the support plane of the at least one, in particular further placement and/or storage position. Given a design having at least one raised support on the palm grip, it is feasible to place the handheld power tool without the battery pack in an additional placement and/or storage position, whereby the handheld power tool can be placed on the work surface via the at least one raised support on the palm grip and a further support point on the handle housing, in particular in a region of the battery pack interface. Additionally or alternatively, it is also feasible for at least one raised support to be arranged on the handle housing, in particular in the region of the battery pack interface.

It is further proposed that the support unit is designed for placing and/or storing the sander on the work surface in at least one, in particular the further placement and/or storage position specified hereinabove, whereby the battery pack comprises a further support surface of the support unit for the further placement and/or storage position. Advantageously, a particularly high degree of flexibility can be achieved while safely placing the sander on a work surface. For example, the edge of the battery pack forms the additional support surface of the support unit for the additional placement and/or storage position. In the further placement and/or storage position, the tool holder surface preferably extends at least substantially parallel to a support plane of the further placement and/or storage position. In the further placement and/or storage position, the drive axis extends in particular at least substantially perpendicular to the support plane of the further placement and/or storage position. In the further placement and/or storage position, the further support surface and the support point of the sander in particular come to lie in the support plane of the further placement and/or storage position. The handheld power tool system is preferably in contact with the work surface in the further placement and/or storage position via the further support surface on the battery pack and the support point on the sander.

It is further proposed that the shutter unit is intended to block a light emission from at least one light source, at least in the direction of an intended operator side. Advantageously, an operator can be prevented from being blinded when working with the safety guard. It can enable particularly safe and/or comfortable working with the protective device. In particular, the shutter unit is intended to block the light emission of the at least one light source in a direction away from the tool holder. The operator side corresponds in particular to a position of the operator in relation to the handheld power tool, in particular the light source, which the operator assumes when working on a workpiece.

In one aspect of the invention, which can in particular be considered independently of further aspects of the invention, it is proposed that the protective device comprises a light source unit. A workpiece can be illuminated with particular precision during processing in an advantageous manner. Advantageously, the light source unit is particularly easy to maintain and/or replace. A particularly high level of operating convenience can be achieved. The light source unit preferably comprises at least one light source, e.g. the light source or multiple light sources specified hereinabove. The light source unit, in particular the at least one light source, is preferably arranged on the base body, the shutter unit, or the light guide unit.

In one aspect of the invention, which can in particular be considered independently of further aspects of the invention, it is proposed that the protective device comprises at least one energy source and/or at least one operating element for at least one light source, in particular the one specified hereinabove. The functionality of the protective device can be advantageously extended. Such a design of the protective device enables particularly comfortable working. The energy source can be in the form of a battery, rechargeable battery, or the like. The energy source is particular intended for supplying energy to the light source, preferably the light source unit. Preferably, the energy source is connected to the light source, in particular the light source unit, at least in one operating state. Alternatively or additionally, however, it is also conceivable that the light source, preferably the light source unit, can be supplied with electrical energy via the handheld power tool, in particular the sander, e.g. via an electrical plug connection between the protective device and the handheld power tool. The at least one operating element of the protective device is preferably arranged on the base body. The at least one operating element of the protective device can, e.g., be designed as a button, a rotary wheel, a switch, or the like. The at least one light source can, e.g., be switched on and/or off and/or an illumination parameter, such as a light color, intensity or the like, can be adjusted via the at least one control element of the protective device.

In one aspect of the invention, which can in particular be considered independently of further aspects of the invention, it is proposed that the protective device comprises a sensor unit for detecting operation of the handheld power tool, in particular for activating at least one light source, in particular the light source unit specified hereinabove, preferably the light source unit, during operation of the handheld power tool. Advantageously, activation of the at least one light source can be automated in an advantageous manner. A particularly high level of user comfort can be achieved in an advantageous manner. The sensor unit is preferably arranged on the base body, on the shutter unit, or on the light guide unit. The sensor unit preferably comprises at least one sensor element, e.g. a vibration sensor or the like, for detecting operation of the handheld power tool. The sensor unit preferably comprises control electronics for processing the sensor signals. The control electronics are preferably connected to the at least one light source, in particular the light source unit, for control purposes. In particular, the control electronics are intended to switch on the light source when operation of the handheld power tool is detected. It is conceivable that the control electronics are a portion of the control unit of the handheld power tool. Alternatively, however, it is also conceivable that the control electronics are designed separately from the control unit.

In one aspect of the invention, which can in particular be considered independently of further aspects of the invention, it is proposed that the protective device is at least partially made of a thermoplastic elastomer, in particular comprising a protective layer consisting of at least partially of a thermoplastic elastomer. A particularly high level of impact protection can be achieved in an advantageous manner. A particularly durable protective device can be provided.

Preferably, the base body of the protective device is at least partially made of a thermoplastic elastomer. Preferably, at least one surface of the protective device facing away from the handheld power tool, in particular the base body, is made of a thermoplastic elastomer. The protective layer can be a cover placed over the base body, a layer glued to the base body, or the like. Alternatively or additionally, it is also conceivable that the protective layer is clamped, screwed, or the like onto the base body. It is also conceivable that the protective layer is injection-molded around the base body, in particular that the protective layer is injection-molded onto the base body, e.g. in a two-component injection molding process.

In one aspect of the invention, which can in particular be considered independently of further aspects of the invention, it is proposed that the protective device comprises a fastening unit for detachable fastening to the handheld power tool with at least two fixing rails which extend parallel to one another and comprise at least two latching recesses. Robust attachment of the protective device to the handheld power tool is easy to implement in an advantageous manner. The handheld power tool, in particular the drive housing, preferably the fan housing, comprises in particular a protective fastening unit corresponding to the fastening unit. The protective fastening unit comprises, e.g., at least one fixing rail. The fixing rail of the protective fastening unit is arranged between the fixing rails of the fastening unit, in particular in a state of the protective device, in particular the base body, arranged on the handheld power tool. The fixing rails of the fastening unit and the fixing rail of the protective fastening unit are preferably intended for fixing in an axial direction relative to one another, preferably with respect to the drive axis. The protective fastening unit preferably comprises two latching elements, in particular latching hooks or the like. In particular, the latching elements are intended to interact with the latching recesses of the fastening unit to fasten the protective device, in particular the base body, to the handheld power tool. Alternatively, it is also conceivable that the design of the fastening unit and the protective fastening unit are interchanged.

In one aspect of the invention, which can in particular be considered independently of further aspects of the invention, it is proposed that the protective device has an asymmetrical basic shape, in particular adapted to a dust outlet of the handheld power tool, in particular the dust outlet specified hereinabove. In particular, a shape of the base body deviates from a circular shape along its longitudinal extent in at least one section, preferably in a region of the dust outlet.

Further proposed is a handheld power tool system, in particular the one specified hereinabove, in particular comprising the handheld power tool and protective device specified hereinabove. Particularly efficient and/or precise illumination of a workpiece to be processed by the handheld power tool can be achieved. Such a design of the protective device can counteract blinding of the operator. Advantageously, a particularly high level of operating comfort and/or safety can be achieved.

In addition, the invention is based on a method for manufacturing a protective device, in particular the protective device specified hereinabove. It is proposed that the protective device be made at least partially of a thermoplastic elastomer. A particularly durable protective device can be provided in an advantageous manner. Particularly efficient impact protection can be achieved in an advantageous manner. Preferably, the base body is made at least partially of a thermoplastic elastomer, e.g. in a single or multi-component injection molding process.

It is further proposed that the handheld power tool device comprises a tool holder, in particular the tool holder specified hereinabove for holding a tool, in particular the tool specified hereinabove, in particular a sanding means, whereby a maximum distance of the extension arm from the drive axis is greater than a maximum distance of the tool holder from the drive axis, in particular when viewed in the separating plane of the handle housing.

A particularly wide support of the drive housing on the handle housing can be advantageously achieved. Advantageously, a particularly high level of stability can be achieved when guiding the handheld power tool, in particular the handheld power tool device.

Advantageously, particularly precise work can be enabled using the handheld power tool. Preferably, a maximum distance of the portion of the damping unit on the extension arm to the drive axis is greater than the maximum distance of the tool holder to the drive axis, in particular when viewed in the separating plane of the handle housing.

It is further proposed that a ratio of a maximum transverse extent of the portion of the damping unit to a minimum distance of the portion of the damping unit from the handle axis of the handle housing is at least 0.9 and at most 1.05. Advantageously, torques around the handle axis can be supported particularly efficiently. A particularly high level of stability can be achieved in an advantageous manner. Particularly precise work can be achieved by the handheld power tool device. The maximum transverse extent of the portion of the damping unit extends in particular at least substantially perpendicular to the main extension plane of the handle housing, preferably the main extension plane of the bow-shaped handle and/or the separating plane. The maximum transverse extent of the portion of the damping unit preferably extends at least substantially parallel to the tool holder surface. The minimum distance of the portion of the damping unit from the handle axis is preferably measured parallel to the separating plane, in particular to the main extension plane of the bow-shaped handle, preferably the main extension plane of the handle housing. The maximum transverse extent of the portion of the damping unit is preferably at least 40 mm, preferably at least 45 mm. The maximum transverse extent of the portion of the damping unit is preferably no more than 60 mm, preferably no more than 50 mm. The ratio between the maximum transverse extent of the portion of the damping unit and the maximum height of the sander is preferably at most 0.35, preferably at most 0.4. The ratio between the maximum transverse extent of the portion of the damping unit and the maximum height of the sander is preferably at most 0.5, preferably at most 0.45. The minimum distance between the portion of the damping unit and the handle axis is preferably at least 45 mm, preferably at least 50 mm. The minimum distance between the portion of the damping unit and the handle axis is preferably at most 60 mm, preferably at most 55 mm. Alternatively, however, it is also conceivable that the minimum distance between the portion of the damping unit and the handle axis is less than 45 mm or greater than 60 mm.

It is also proposed that a ratio between the maximum transverse extent of the portion of the damping unit and a minimum distance of the portion of the damping unit from the drive axis is at least 0.7, preferably at least 0.73, and at most 0.8, preferably at most 0.77. Advantageously, tipping forces can be supported particularly efficiently. A particularly stable handheld power tool device can be provided. The minimum distance of the portion of the damping unit to the drive axis is preferably measured parallel to the separating plane, in particular to the main extension plane of the bow-shaped handle, preferably the main extension plane of the handle housing. The minimum distance between the portion of the damping unit and the drive axis is preferably at least 55 mm, preferably at least 60 mm. The minimum distance between the portion of the damping unit and the drive axis is preferably no more than 70 mm, preferably no more than 65 mm. Alternatively, however, it is also conceivable that the minimum distance between the portion of the damping unit and the drive axis is less than 55 mm or greater than 70 mm.

It is further proposed that a ratio of a maximum height of the housing unit to the minimum distance of the portion of the damping unit on the extension arm from the handle axis of the handle housing is at most 2.25. A particularly wide support of the drive housing on the handle housing can be achieved. Advantageously, a particularly high level of stability can be achieved when handling the handheld power tool, in particular the sander. The maximum height of the housing unit preferably extends in the separating plane, in particular in the main extension plane of the handle housing, preferably in the main extension plane of the bow-shaped handle. The maximum height of the housing unit extends parallel to the drive axis in particular. The maximum height of the housing unit is preferably at least 90 mm, preferably at least 100 mm. The maximum height of the housing unit is preferably at most 120 mm, preferably at most 110 mm. Alternatively, however, it is also conceivable that the maximum height of the housing unit in the direction of the drive axis is less than 90 mm or greater than 120 mm. A ratio of a maximum extent of the damping unit, in particular a maximum distance between the damping elements, in the direction of the drive axis to the maximum height of the housing unit is preferably at least 0.8, preferably at least 0.85. A ratio of the maximum extent of the damping unit, in particular a maximum distance between the damping elements, in the direction of the drive axis to the maximum height of the sander is preferably at least 0.7, preferably at least 0.75. The maximum extent of the damping unit, in particular the maximum distance between the damping elements, in the direction of the drive axis is preferably at least 85 mm, preferably at least 90 mm. Alternatively, however, it is also conceivable that the maximum extent of the damping unit, in particular the maximum distance between the damping elements, in the direction of the drive axis is less than 85 mm.

It is also proposed that a ratio of the minimum distance of the portion of the damping unit from the drive axis in a direction perpendicular to the drive axis to a maximum longitudinal extent of the housing unit is greater than 0.3. A particularly wide support of the drive housing on the handle housing can be achieved. Advantageously, a particularly high level of stability can be achieved when handling the handheld power tool, in particular the sander. The maximum longitudinal extent of the housing unit is preferably perpendicular to the drive axis. The maximum longitudinal extent of the housing unit preferably extends at least substantially parallel to the tool holder surface. The maximum longitudinal extent of the housing unit extends in particular in the separating plane, preferably in the main extension plane of the handle housing, in particular in the main extension plane of the bow-shaped handle. The maximum longitudinal extent of the housing unit is preferably at least 175 mm, preferably at least 180 mm. The maximum longitudinal extent of the housing unit is preferably no more than 190 mm, preferably no more than 185 mm. Alternatively, however, it is also conceivable that the maximum longitudinal extent of the housing unit is less than 175 mm or greater than 190 mm.

It is further proposed that a ratio of the minimum distance between the portion of the damping unit and the drive axis to the minimum distance between the portion of the damping unit and the handle axis of the handle housing is at least 1.2 and at most 1.3. A handheld power tool with a particularly favorable support of the drive housing on the handle housing can be provided.

It is further proposed that the handle housing comprises a bow-shaped handle, in particular the bow-shaped handle specified hereinabove, which is supported by the portion of the damping unit and/or the extension arm on the drive housing to form the closed handle recess of the bow-shaped handle. A particularly efficient support of the drive housing on the handle housing can be achieved along with simultaneous vibration decoupling of the handle housing from the drive housing. A particularly high level of handling stability can be achieved with a particularly high level of operating convenience.

It is also proposed that the portion of the damping unit and/or the extension arm is arranged in the direction of the handle axis at the height of the handle recess. A particularly wide support of the drive housing on the handle housing can be achieved. Advantageously, a handheld power tool device can be provided with particularly high stability and, at the same time, particularly efficient vibration decoupling. Preferably, the portion of the damping unit on the extension arm and/or the extension arms, viewed in the direction of the handle axis, is arranged at least substantially completely within the maximum longitudinal extent of the handle recess.

It is further proposed that the portion of the damping unit arranged on the extension arm comprises at least two damping elements arranged at a distance from each other. A particularly favorable ratio between stable support of the drive housing on the handle housing and vibration decoupling of the handle housing from the drive housing can be achieved in an advantageous manner. The damping elements are preferably arranged on opposite sides of the extension arm. Preferably, the damping elements are arranged on different sides of the separating plane, in particular the main extension plane of the handle housing, preferably the main extension plane of the bow-shaped handle. Preferably, the damping elements are arranged in mirror symmetry with respect to the separating plane, in particular the main extension plane of the handle housing, preferably the main extension plane of the bow-shaped handle. The extension arm preferably comprises two damping element holders for the two damping elements specified hereinabove, or the damping element holder is configured to hold the two damping elements.

It is also proposed that the housing unit comprises a fan housing, in particular the fan housing specified hereinabove for holding an extraction fan, in particular the extraction fan specified hereinabove, whereby the extension arm is arranged on the fan housing. A particularly wide support for the drive housing can be achieved in an advantageous manner. Particularly stable guidance of the handheld power tool, in particular the handheld power tool device, can be achieved with simultaneous vibration decoupling of the drive housing from the handle housing. In particular, the extraction fan is a portion of the handheld power tool, preferably the sander. Alternatively, it is also conceivable that the handheld power tool, in particular the sander, is designed without an extraction fan. Preferably, the extension arm is designed to be at least partially integral with the fan housing. The extension arm is arranged in particular on a side of the fan housing facing the battery pack interface. It is conceivable that the extension arm is, e.g., preferably arranged between two swing legs of the tool holder on a handheld power tool designed as an orbital sander, which comprises a rectangular tool holder. In particular, the swing legs are made of an clastic material, preferably plastic. The swing legs are preferably connected to the drive housing, in particular to the fan housing.

In one aspect of the invention, which can in particular be considered independently of further aspects of the invention, it is proposed that the drive housing comprises a motor housing, in particular the motor housing specified hereinabove for holding the drive unit and a fan housing, in particular the fan housing specified hereinabove for holding an extraction fan, in particular the extraction fan specified hereinabove, whereby the motor housing and the fan housing are designed to be at least partially integral with one another. A tolerance chain can be kept particularly low in an advantageous manner. A particularly high stability of the drive housing can be achieved. The fan housing and the motor housing comprise common housing shells, in particular the housing shells of the drive housing specified hereinabove. The two housing shells each comprise one half of the fan housing and one half of the motor housing.

In one aspect of the invention, which can in particular be considered independently of further aspects of the invention, it is proposed that the drive housing comprises a motor housing, in particular the motor housing specified hereinabove, on which at least one damping element of the damping unit is arranged such that the damping element is only partially enclosed by the handle housing when viewed in a sectional plane perpendicular to the drive axis through the damping element. Advantageously, the handle housing can be supported on the drive housing at a point on the handle housing that is particularly far outwards in the axial direction, in particular in relation to the drive axis. Particularly efficient support can be achieved with simultaneous vibration decoupling. A particularly high level of stability can be achieved when handling the handheld power tool, in particular the sander. Preferably, the cutting plane through the damping element only intersects a portion of the end of the handle housing facing the center bar, in particular due to the two recesses in the end for the center bar.

In one aspect of the invention, which can in particular be considered independently of further aspects of the invention, it is proposed that the damping unit comprises at least one scaling element, in particular a sealing ring, in order to block an inlet of exhaust air into the housing unit, in particular into the handle housing, whereby the sealing element, in particular the scaling ring, is arranged between the handle housing and the drive housing. Warm engine air can in an advantageous manner be prevented from flowing into the handle housing. Overheating of the handheld power tool, in particular the sander, can be counteracted. It is conceivable that the sealing element is arranged, in particular designed, as a closed sealing ring. The sealing element surrounds the motor housing in a circumferential direction, which in particular extends in a plane perpendicular to the drive axis, preferably at least substantially completely, in particular in an angular range of at least 270°, preferably at least 330°, preferably at least 350°, and particularly preferably completely. The sealing element preferably fills a gap between the motor housing and the handle housing at least substantially completely. The sealing element is preferably made of an elastic material, preferably an elastic plastic. Preferably, the material hardness of the sealing element preferably is different from the material hardness of the damping elements. The material hardness of the sealing element is preferably lower than the material hardness of the damping elements. Alternatively, it is conceivable that the sealing element and the damping elements have an identical material hardness. The sealing element is arranged above at least one air outlet in relation to the tool holder.

The handheld power tool, in particular the sander, the handheld power tool system, the protective device, the method, and/or the handheld power tool device are not intended to be limited to the application and embodiment described hereinabove. In particular, the handheld power tool, in particular the sander, the handheld power tool system, the method, and/or the handheld power tool device can/can comprise a number of individual elements, components, and units as well as method steps that deviates from a number specified herein in order to fulfill a mode of operation described herein. Moreover, regarding the ranges of values indicated in this disclosure, values lying within the limits specified hereinabove are also intended to be considered as disclosed and usable as desired.

BRIEF DESCRIPTION OF THE DRAWINGS

Further advantages follow from the description of the drawings hereinafter. Two exemplary embodiments of the invention are shown in the drawings. The drawings, the description, and the claims contain numerous features in combination. The skilled person will appropriately also consider the features individually and combine them into additional advantageous combinations.

Shown are.

DETAILED DESCRIPTION

Figure 1:
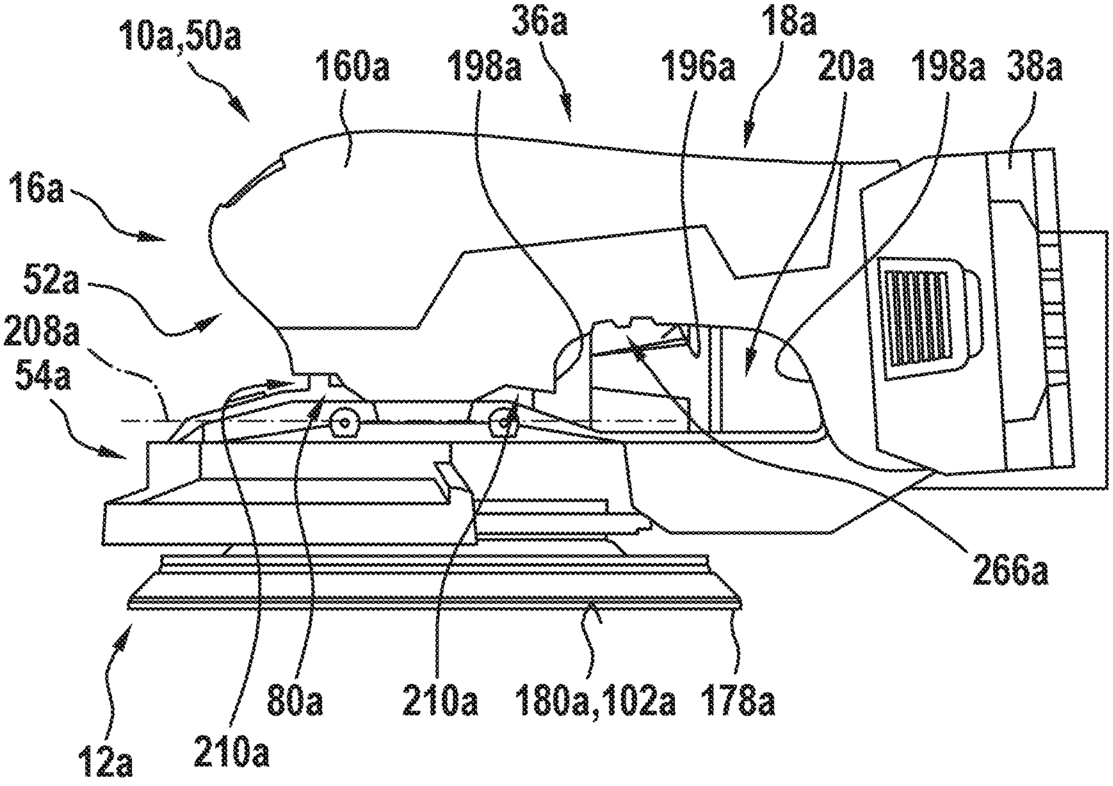
FIG. 1 a handheld power tool system comprising a handheld power tool in a side view, FIG. 2 the handheld power tool system in a plan view, FIG. 3 the handheld power tool system in a front view, FIG. 4 the handheld power tool system in side view, comprising a handle housing shell, FIG. 5 the handheld power tool system in a cross-sectional view in a separating plane of a handle housing of the handheld power tool, FIG. 6 a top view of the handheld power tool in a cross-sectional view, FIG. 7 the handheld power tool system in a placement and/or storage position on a work surface, FIG. 8 the handheld power tool system in a further placement and/or storage position on the work surface, FIG. 9A a perspective view of a base body of a protective device of the handheld power tool system, FIG. 9B the base body of the protective device in a plan view, FIG. 10A a section of a drive housing of the handheld power tool in a perspective view, FIG. 10B the drive housing in a plan view, FIG. 11 a schematic sequence of a method for manufacturing a handheld power tool device for the handheld power tool, and FIG. 12 a handheld power tool system with a handheld power tool in an alternative embodiment.

FIG. 1 shows a handheld power tool system 36*a* comprising a handheld power tool 50*a*, in particular a hand-held sander. The handheld power tool 50*a* is designed as a sander 10*a*, in particular as a battery-operated sander. Alternatively, however, it is also conceivable that the handheld power tool 50*a*, in particular the sander 10*a*, is designed as a grid-powered handheld power tool. The sander 10*a* is designed as a random orbital sander. Alternatively, however, it is also conceivable that the sander 10*a* is designed as an orbital sander, a delta sander, a flower sander, or the like.

The handheld power tool 50*a* comprises a tool holder 12*a* for holding a tool 178*a*. The tool holder 12*a* is designed as a sanding pad. The tool holder 12*a* is designed as a round sanding pad. Alternatively, however, it is also conceivable that the tool holder 12*a* is designed as a delta pad, as a square, preferably rectangular, sanding pad, or as another sanding pad that a skilled person considers useful.

The tool holder 12*a* comprises fastening means for fastening the tool 178*a*. The tool holder 12*a* preferably comprises a hook-and-loop surface 180*a* for fastening the tool 178*a*. Alternatively or additionally, it is conceivable that the fastening means comprise multiple hook-and-loop surfaces, one or multiple clips, a combination of these, or other fastening means that a skilled person considers useful. The tool 178*a* is designed as a sanding means, e.g. as an abrasive paper, an abrasive fleece, an abrasive grid, or the like.

Figure 5:
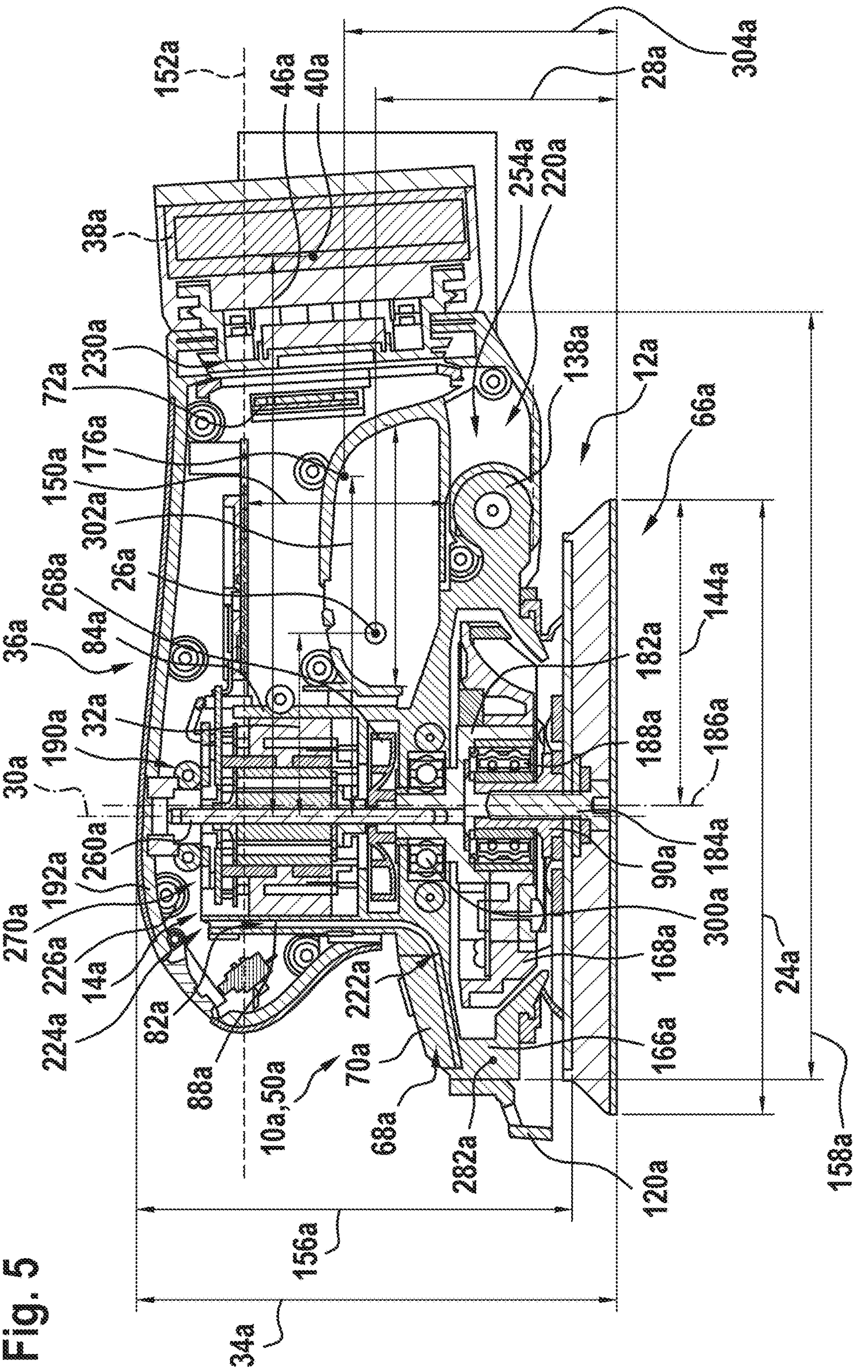

The handheld power tool 50*a* comprises a drive unit 14*a* for driving the tool holder 12*a*. The drive unit 14*a* comprises a drive element 182*a*, preferably an eccentric (see FIG. 5). The drive element 182*a* is intended for driving about a drive axis 30*a* of the drive unit 14*a*. The handheld power tool 50*a* comprises an output unit 66*a*. The tool holder 12*a* is a portion of the output unit 66*a*. The output unit 66*a* comprises a connecting piece 90*a*. The connecting piece 90*a* is arranged, preferably fixed, on the drive element 182*a*. The tool holder 12*a* is fastened to the connecting piece 90*a*, in particular in a rotationally fixed manner, e.g. by means of a screw 184*a* or the like.

The output unit 66*a* comprises an output axis 186*a*. The output axis 186*a* preferably extends at least substantially parallel to the drive axis 30*a*. The drive axis 30*a* is at a distance from the output axis 186*a*. The connecting piece 90*a* and/or the tool holder 12*a*, in particular the output axis 186*a*, moves in at least one operating state about the drive axis 30*a*, preferably circularly. The drive element 182*a* is intended to drive the connecting piece 90*a* and/or the tool holder 12*a*, in particular the output axis 186*a*, to a, preferably circular, movement about the drive axis 30*a* of the drive element 182*a*.

The connecting piece 90*a* is rotatably attached to the drive element 182*a*, in particular rotatable about the output axis 186*a*. The handheld power tool 50*a* comprises at least one bearing element 188*a*. The connecting piece 90*a* is rotatably mounted on the drive element 182*a* via the bearing element 188*a*, in particular about the output axis 186*a*. The bearing element 188*a* is preferably arranged between the drive element 182*a* and the connecting piece 90*a*. The bearing element 188*a* can be designed as a radial bearing, in particular as a rolling bearing, e.g. as a ball bearing, or as a plain bearing.

The drive unit 14*a* is intended to drive the output unit 66*a*, in particular the tool holder 12*a*. The drive unit 14*a* comprises an electric motor 190*a*, in particular for driving the drive element 182*a*.

The handheld power tool 50*a*, in particular the sander 10*a*, comprises at least one further bearing element 300*a*. The drive element 182*a* is rotatably mounted on a drive housing 54*a* of the handheld power tool 50*a* via the further bearing element 300*a*, in particular rotatable about the drive axis 30*a*. The further bearing element 300*a* can be designed as a radial bearing, in particular as a rolling bearing, e.g. as a ball bearing, or as a plain bearing.

The handheld power tool 50, in particular the sander 10*a*, comprises a housing unit 16*a*. The housing unit 16*a* comprises a drive housing 54*a* for holding the drive unit 14*a*. The drive housing 54*a* is designed as a plastic housing. Alternatively, however, it is also conceivable that the drive housing 54*a* is at least partially designed as a metal housing, e.g. as an aluminum housing or the like.

The housing unit 16*a* comprises a handle housing 52*a*. The handle housing 52*a* is designed as a plastic housing. Alternatively, however, it is also conceivable that the handle housing 52*a* is at least partially designed as a metal housing, e.g. as an aluminum housing or the like. The handle housing 52*a* comprises two handle housing shells 192*a*, 194*a*, which are connected to one another in particular in a separating plane 146*a* of the handle housing 52*a*. The handle housing 52*a* is designed to be separate from the drive housing 54*a*, in particular arranged at a distance from the drive housing 54*a*. In particular, the handle housing 52*a* comprises a shell structure, with the two handle housing shells 192*a*, 194*a* acting as half shells.

The housing unit 16*a* comprises a bow-shaped handle 18*a*. The bow-shaped handle 18*a* is a portion of the handle housing 52*a*. The bow-shaped handle 18*a* comprises a finger grip surface 196*a*. The bow-shaped handle 18*a* comprises two walls 198*a*, in particular side walls, which delimit the finger grip surface 196*a*, in particular viewed in a main extension plane 42*a* of the bow-shaped handle 18*a* and in a direction perpendicular to the drive axis 30*a*. The bow-shaped handle 18*a* is designed as a closed bow-shaped handle. Alternatively, however, it is also conceivable that the bow-shaped handle 18*a* is designed as an open bow-shaped handle. The walls 198*a* define, in particular delimit, a handle recess 20*a* of the bow-shaped handle 18*a* at least partially.

A maximum longitudinal extent 22*a* of the handle recess 20*a* extends at least substantially parallel to a tool receiving surface 102*a* of the tool holder 12*a*. The maximum longitudinal extent 22*a* of the handle recess 20*a* extends in a main extension plane 64*a* of the handle housing 52*a*, preferably in the main extension plane 42*a* of the bow-shaped handle 18*a*, in particular in the separating plane 146*a* of the handle housing 52*a*. The tool holder surface 102*a* extends at least substantially perpendicular to the separating plane 146*a*, the main extension plane 64*a* of the handle housing 52*a*, and/or the main extension plane 42*a* of the bow-shaped handle 18*a*.

The main extension plane 42*a* of the bow-shaped handle 18*a* is in this case congruent with the main extension plane 64*a* of the handle housing 52*a*. Alternatively, it is conceivable that the main extension plane 42*a* of the bow-shaped handle 18*a* is different from the main extension plane 64*a* of the handle housing 52*a*. The separating plane 146*a* is in this case congruent with the main extension plane 64*a* of the handle housing 52*a*, in particular the main extension plane 42*a* of the bow-shaped handle 18*a*. Alternatively, however, it is also conceivable that the main extension plane 42*a* of the bow-shaped handle 18*a* and/or the main extension plane 64*a* of the handle housing 52*a* are/is different from the separating plane 146*a*.

A ratio of the maximum longitudinal extent 22*a* of the handle recess 20*a* of the bow-shaped handle 18*a* to a maximum longitudinal extent 24*a* of the tool holder 12*a* is at least 0.35, preferably at least 0.38. The ratio of the maximum longitudinal extent 22*a* of the handle recess 20*a* of the bow-shaped handle 18*a* to a maximum longitudinal extent 24*a* of the tool holder 12*a* is at most 0.5, preferably at most 0.45, and preferably at most 0.42. Particularly preferably, the ratio of the maximum longitudinal extent 22*a* of the handle recess 20*a* of the bow-shaped handle 18*a* to the maximum longitudinal extent 24*a* of the tool holder 12*a* is at least substantially 0.4.

The maximum longitudinal extent 22*a* of the handle recess 20*a* is at least 50 mm, preferably at least 55 mm, and particularly preferably at least 60 mm. The maximum longitudinal extent 22*a* of the handle recess 20*a* is at most 80 mm, preferably at most 70 mm, and particularly preferably at most 75 mm. The maximum longitudinal extent 22*a* of the handle recess 20*a* is in this case, by way of example, at least substantially 61 mm. Alternatively, however, it is also conceivable that the maximum longitudinal extent 22*a* of the handle recess 20*a* is greater than 80 mm or less than 50 mm.

The maximum longitudinal extent 24*a* of the tool holder 12*a* in this case corresponds in particular to a maximum diameter of the tool holder surface 102*a*. The maximum longitudinal extent 24*a* is in this case, by way of example, 150 mm, in particular between 148 mm and 152 mm. Alternatively, however, it is also conceivable that the maximum longitudinal extent 24*a* of the tool holder 12*a*, in particular the maximum diameter of the tool holder surface 102*a*, is greater than 150 mm, in particular greater than 152 mm, or smaller than 150 mm, in particular smaller than 148 mm.

A maximum diameter of the tool 178*a* is greater than the maximum longitudinal extent 24*a* of the tool holder 12*a*. Alternatively, however, it is also conceivable that the maximum diameter of the tool 178*a* is the same size or smaller than the maximum longitudinal extent 24*a* of the tool holder 12*a*.

The maximum longitudinal extent 24*a* of the tool holder 12*a* extends at least substantially parallel to the maximum longitudinal extent 22*a* of the handle recess 20*a* and/or the tool holder surface 102*a*. The maximum longitudinal extent 24*a* of the tool holder 12*a* extends along the separating plane 146*a* of the handle housing 52*a*, the main extension plane 64*a* of the handle housing 52*a*, and/or in the main extension plane 42*a* of the bow-shaped handle 18*a*. The maximum longitudinal extent 24*a* of the tool holder 12*a* is defined by a maximum longitudinal extent of the tool holder surface 102*a*. The tool 178*a* is intended to be arranged on the tool holder surface 102*a*. The hook and loop surface 180*a* corresponds to the tool holder surface 102*a*.

The handle housing 52*a* comprises a palm grip 160*a*, in particular a grip knob. The palm grip 160*a* is arranged such that the drive axis 30*a* intersects the palm grip 160*a*. In particular, the bow-shaped handle 18*a* merges into the palm grip 160*a*, preferably adjoining the palm grip 160*a*.

The handheld power tool 50*a* comprises an extraction fan 168*a*. The extraction fan 168*a* is intended for suction away from the workpiece during the machining of a workpiece and, in particular to blow it out of a dust outlet 44*a*.

A fan housing 166*a* of the housing unit 16*a*, in particular of the drive housing 54*a*, for holding the extraction fan 168*a* is arranged between the tool holder 12*a* and the palm grip 160*a*. The handle housing 52*a*, in particular the palm grip 160*a*, surround a motor housing 78*a* of the drive housing 54*a*, preferably at least in a plane extending perpendicular to the drive axis 30*a*.

The sander 10*a* comprises a battery pack interface 218*a* for electrical and/or mechanical connection to a battery pack 38*a*. The battery pack interface 218*a* includes guidance means, e.g. one or multiple guide rails or the like, for guiding the battery pack 38*a* during an assembly and/or disassembly of the battery pack 38*a* to and/or from the battery pack interface 218*a*. The battery pack interface 218*a*, in particular the guidance means, specifies an insertion direction for the battery pack 38*a* when the battery pack 38*a* is mounted on the battery pack interface 218*a*. The direction of insertion preferably extends at least substantially perpendicular to the drive axis 30*a*, to the separating plane 146*a*, to the main extension plane 42*a* of the bow-shaped handle 18*a*, and/or to the main extension plane 64*a* of the handle housing 52*a*. The insertion direction extends at least substantially parallel to the tool holder surface 102*a*.

The battery pack interface 218*a* is arranged on the handle housing 52*a*, in particular on a side of the bow-shaped handle 18*a* facing away from the palm grip 160*a*. The battery pack interface 218*a* has no interface with the drive axis 30*a* and/or with a main extension plane 232*a* of the tool holder surface 102*a*.

The handheld power tool 50*a* comprises at least one input element 162*a*. The handheld power tool 50*a* can be switched on and/or off by an actuation of the input element 162*a* by the operator. Alternatively or additionally, it is conceivable that a rotational speed of the handheld power tool 50*a* or the like can be adjustable by way of the input element 162*a*. The input element 162*a* can, e.g. be designed as a button, a rotary wheel, a switch, or the like. The input element 162*a* is arranged on the palm grip 160*a*, preferably on a side of the palm grip 160*a* facing away from the battery pack interface 218*a*, the tool holder 12*a* and/or the bow-shaped handle 18*a*.

The sander 10*a* is intended to be guided with one hand, in particular by means of the bow-shaped handle 18*a* and the palm grip 160*a*. Alternatively, however, it is also conceivable that the sander 10*a* is designed as a two-hand guide, whereby one hand of the operator is arranged on the palm grip 160*a* and one on the bow-shaped handle 18*a*.

A center of gravity 26*a* of the handheld power tool 50*a* is arranged in the handle recess 20*a*. The center of gravity 26*a* is arranged within the handle recess 20*a*, viewed at least in a direction perpendicular to the main extension plane 42*a* of the bow-shaped handle 18*a*, in particular to the main extension plane 64*a* of the handle housing 52*a*.

A minimum distance (not shown in this case) of the center of gravity 26*a* from the separating plane 146*a* of the handle housing 52*a*, from the main extension plane 64*a* of the handle housing 52*a*, and/or from the main extension plane 42*a* of the bow-shaped handle 18*a* is smaller than a maximum transverse extent 200*a* of the handle housing 52*a*, starting from the separating plane 146*a* of the handle housing 52*a*, the main extension plane 64*a* of the handle housing 52*a*, and/or the main extension plane 42*a* of the bow-shaped handle 18*a*. It is also conceivable that the center of gravity 26*a* is arranged in the separating plane 146*a* of the handle housing 52*a*, in the main extension plane 64*a* of the handle housing 52*a*, and/or in the main extension plane 42*a* of the bow-shaped handle 18*a*.

The maximum transverse extent 200*a* of the handle housing 52*a*, in particular of the bow-shaped handle 18*a*, in particular starting from the separating plane 146*a* of the handle housing 52*a*, the main extension plane 64*a* of the handle housing 52*a*, and/or the main extension plane 42*a* of the bow-shaped handle 18*a*, extends at least substantially perpendicular to the main extension plane 42*a* of the bow-shaped handle 18*a*, in particular to the main extension plane 64*a* of the handle housing 52*a*, to the separating plane 146*a*, and/or to the drive axis 30*a*. The maximum transverse extent 200*a* of the handle housing 52*a*, in particular of the bow-shaped handle 18*a*, in particular starting from the separating plane 146*a* of the handle housing 52*a*, the main extension plane 64*a* of the handle housing 52*a*, and/or the main extension plane 42*a* of the bow-shaped handle 18*a*, extends at least substantially parallel to the tool holder surface 102*a*.

A ratio of a maximum distance 28*a* of the tool holder 12*a* from the center of gravity 26*a* in the direction of the drive axis 30*a* of the drive unit 14*a* to a minimum distance 32*a* between the drive axis 30*a* and the center of gravity 26*a* is at least 2.8, preferably at least 3.0, preferably at least 3.1. The ratio of a maximum distance 28*a* of the tool holder 12*a* from the center of gravity 26*a* in the direction of the drive axis 30*a* of the drive unit 14*a* to a minimum distance 32*a* between the drive axis 30*a* and the center of gravity 26*a* is at most 3.5, preferably at most 3.2.

The maximum distance 28*a* of the tool holder 12*a* from the center of gravity 26*a* in the direction of the drive axis 30*a* is at least 30 mm, preferably at least 33 mm, preferably at least 35 mm. The maximum distance 28*a* of the tool holder 12*a* from the center of gravity 26*a* in the direction of the drive axis 30*a* is in particular at most 50 mm, preferably at most 45 mm and particularly preferably at most 40 mm. By way of example, the maximum distance 28*a* of the tool holder 12*a* from the center of gravity 26*a* in the direction of the drive axis 30*a* is at least substantially 38 mm here. Alternatively, however, it is also conceivable that the maximum distance 28*a* of the tool holder 12*a* from the center of gravity 26*a* in the direction of the drive axis 30*a* is less than 30 mm or greater than 50 mm.

The minimum distance 32*a* of the drive axis 30*a* from the center of gravity 26*a* is in particular at least 8 mm, preferably at least 10 mm. The minimum distance 32*a* of the drive axis 30*a* from the center of gravity 26*a* is in particular at most 20 mm, preferably at most 15 mm. By way of example, the minimum distance 32*a* of the drive axis 30*a* from the center of gravity 26*a* is at least substantially 38 mm. Alternatively, however, it is also conceivable that the minimum distance 32*a* of the drive axis 30*a* from the center of gravity 26*a* is less than 8 mm or greater than 20 mm.

The maximum distance 28*a* of the tool holder 12*a* from the center of gravity 26*a* in the direction of the drive axis 30*a* is defined by a distance of the tool holder surface 102*a* from the center of gravity 26*a* in the direction of the drive axis 30*a*.

The drive axis 30*a* extends at least substantially perpendicular to the tool holder surface 102*a*. The drive axis 30*a* extends at least substantially parallel to the main extension plane 64*a* of the handle housing 52*a*, in particular to the main extension plane 42*a* of the bow-shaped handle 18*a*, and/or to the separating plane 146*a*. The drive axis 30*a* extends along the main extension plane 64*a* of the handle housing 52*a*, along the main extension plane 42*a* of the bow-shaped handle 18*a*, and/or along the separating plane 146*a*.

The minimum distance 32*a* between the drive axis 30*a* and the center of gravity 26*a* is at least substantially perpendicular to the drive axis 30*a*. The minimum distance 32*a* between the drive axis 30*a* and the center of gravity 26*a* extends at least substantially parallel to the tool holder surface 102*a*, to the main extension plane 64*a* of the handle housing 52*a*, to the main extension plane 42*a* of the bow-shaped handle 18*a*, and/or to the separating plane 146*a*.

A maximum height 34*a* of the handheld power tool 50*a*, in particular of the sander 10*a*, has a ratio of at least 2.8, preferably at least 3.0, in the direction of the drive axis 30*a* to the maximum distance 28*a* between the tool holder 12*a* and the center of gravity 26*a* in the direction of the drive axis 30*a*. The ratio of the maximum height 34*a* of the sander 10*a* in the direction of the drive axis 30*a* to the maximum distance 28*a* between the tool holder 12*a* and the center of gravity 26*a* in the direction of the drive axis 30*a* is at most 3.2, preferably at most 3.1.

The maximum height 34*a* of the sander 10*a* is in this case, by way of example, at least 100 mm, preferably at least 110 mm. The maximum height 34*a* of the sander 10*a* is in this case, by way of example, at most 130 mm, preferably at most 120 mm. Alternatively, however, it is also conceivable that the maximum height 34*a* of the sander 10*a* in the direction of the drive axis 30*a* is less than 110 mm or greater than 130 mm. The maximum height 34*a* of the sander 10*a* in the direction of the drive axis 30*a* extends from the tool holder surface 102*a* parallel to the drive axis 30*a* to an outermost point of the handle housing 52*a*.

A ratio of the maximum height 34*a* of the sander 10*a* to a maximum height 202*a* of the handle recess 20*a* in a direction extending parallel to the drive axis 30*a* is at least 4.0, preferably at least 4.3, particularly preferably at least 4.4. The ratio of the maximum height 34*a* of the sander 10*a* to the maximum height 202*a* of the handle recess 20*a* extending in a direction parallel to the drive axis 30*a* is at most 5.0, preferably at most 4.7, particularly preferably at most 4.6. The maximum height 34*a* of the handle recess 20*a* is in this case, by way of example, between 20 mm and 30 mm, preferably between 24 mm and 28 mm, and particularly preferably at least substantially 26 mm.

The handle recess 20*a* is closed, preferably substantially ovally closed. The handle recess 20*a* is closed when viewed in the main extension plane 42*a* of the bow-shaped handle 18*a*, in the main extension plane 64*a* of the handle housing 52*a*, and/or in the separating plane 146*a*. The handle recess 20*a* is closed by walls of the drive housing 54*a*, in particular the fan housing 166*a* of the drive housing 54*a*, and the handle housing 52*a*. Alternatively, it is conceivable that the handle recess 20*a* is completely closed by walls of the handle housing 52*a*.

The handle recess 20*a* has an oval shape, in particular when viewed in a direction perpendicular to the main extension plane 42*a* of the bow-shaped handle 18*a*, preferably to the main extension plane 64*a* of the handle housing 52*a*. Alternatively, however, it is also conceivable that the handle recess 20*a* has a rectangular shape, a square shape, a circular shape, or another shape that a skilled person considers useful, in particular when viewed in the direction perpendicular to the main extension plane 42*a* of the bow-shaped handle 18*a*, preferably to the main extension plane 64*a* of the handle housing 52*a*.

The handheld power tool system 36*a* comprises the battery pack 38*a* for supplying power to the handheld power tool 50*a*. The battery pack 38*a* has a battery pack center of gravity 40*a*. In a state arranged on the sander 10*a*, the battery pack center of gravity 40*a* is offset from the main extension plane 42*a* of the bow-shaped handle 18*a*.

A minimum distance (not shown in this case) of the battery pack center of gravity 40*a* from the separating plane 146*a* of the handle housing 52*a*, from the main extension plane 64*a* of the handle housing 52*a* and/or from the main extension plane 42*a* of the bow-shaped handle 18*a* is smaller than the maximum transverse extent 200*a* of the handle housing 52*a*, in particular of the bow-shaped handle 18*a*, starting from the separating plane 146*a* of the handle housing 52*a*, the main extension plane 64*a* of the handle housing 52*a*, or the main extension plane 42*a* of the bow-shaped handle 18*a*.

The minimum distance of the battery pack center of gravity 40*a* from the separating plane 146*a* of the handle housing 52*a*, from the main extension plane 64*a* of the handle housing 52*a*, and/or from the main extension plane 42*a* of the bow-shaped handle 18*a* is in particular less than 20 mm, preferably less than 15 mm, and preferably less than 10 mm. The minimum distance of the battery pack center of gravity 40*a* from the separating plane 146*a* of the handle housing 52*a*, from the main extension plane 64*a* of the handle housing 52*a*, and/or from the main extension plane 42*a* of the bow-shaped handle 18*a* is in this case, by way of example, at least substantially 8 mm.

The handheld power tool system 36*a* comprises a dust outlet 44*a*. The dust outlet 44*a* is arranged on the drive housing 54*a*, in particular on the fan housing 166*a*. The battery pack center of gravity 40*a* and the dust outlet 44*a* are arranged on different sides of the main extension plane 42*a* of the bow-shaped handle 18*a*. The center of gravity 26*a* of the sander 10*a* and the battery pack center of gravity 40*a* are arranged on different sides of the main extension plane 42*a* of the bow-shaped handle 18*a*.

Figure 2:
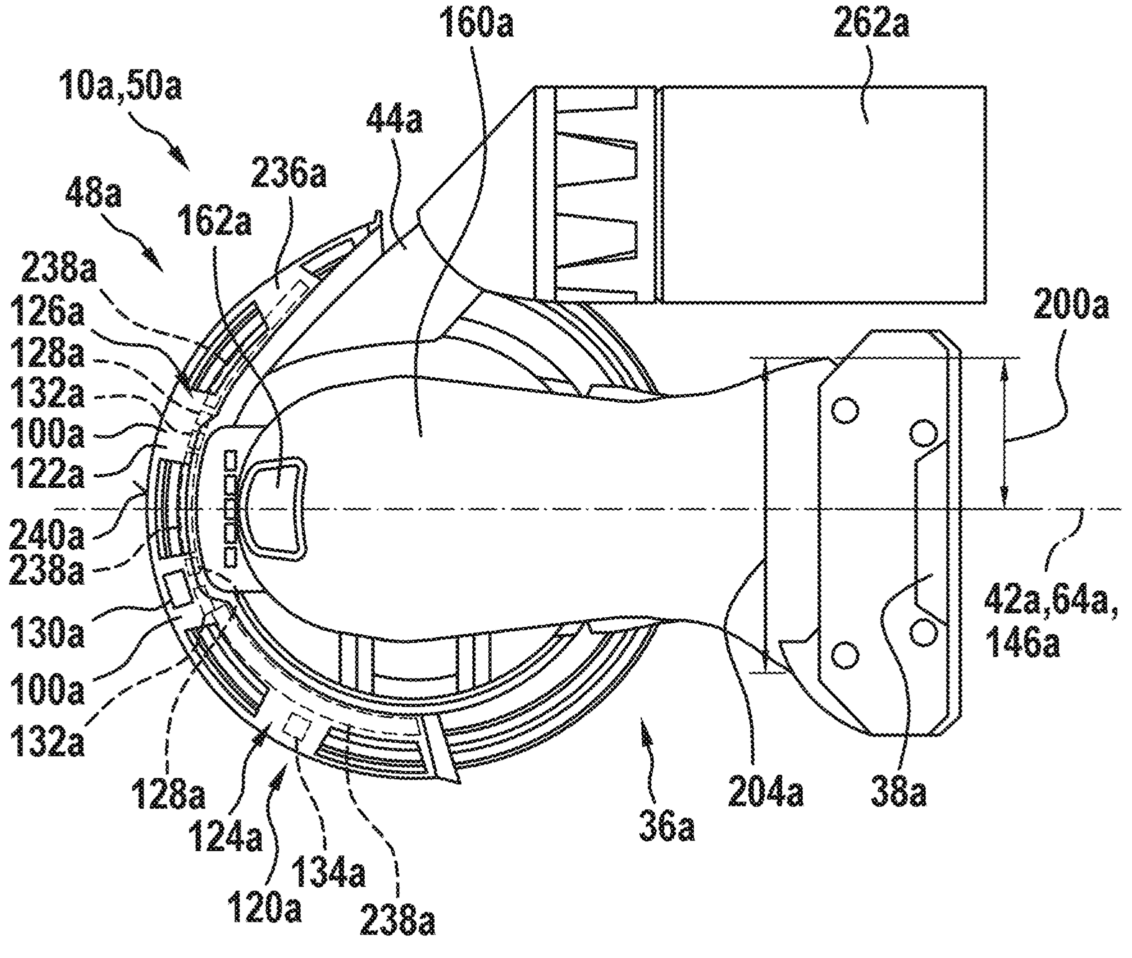

The handheld power tool system 36*a* comprises a dust collection container 262*a*, e.g. a dust box, a dust bag, or the like (see FIG. 2). The dust collection container 262*a* can be attached, in particular detachably, to the dust outlet 44*a*, e.g. by means of a screw connection, a latching connection, or the like. Alternatively, it is also conceivable that at least one dust outlet connecting piece of the dust collection container 262*a* is designed to be integral with the dust outlet 44*a*.

The dust collection container 262*a* is rotatably mounted on the dust outlet 44*a*.

Alternatively, however, it is also conceivable that the dust collection container 262*a* can be connected to the dust outlet 44*a* in a rotationally fixed manner. The dust collection container 262*a* is intended for collecting dust and/or material removed by extraction, preferably by means of the suction fan 168*a*.

Alternatively or additionally, it is conceivable that the dust outlet 44*a* can be coupled to an active extraction device (not shown in this case), e.g. a vacuum cleaner or the like, in particular in the case of a handheld power tool 50*a* which is designed without an extraction fan 168*a*. The dust outlet 44*a* is arranged on one side of the separating plane 146*a*, the main extension plane 42*a* of the bow-shaped handle 18*a*, and/or the main extension plane 64*a* of the handle housing 52*a*.

A ratio of a minimum distance 46*a* between the battery pack center of gravity 40*a* in a state arranged on the sander 10*a* and the drive axis 30*a* to the maximum longitudinal extent 24*a* of the tool holder 12*a* is at least 0.85 and at most 1.2.

The minimum distance 46*a* between the battery pack center of gravity 40*a* in a state arranged on the sander 10*a* and the drive axis 30*a* extends at least substantially parallel to the tool holder surface 102*a*, the main extension plane 42*a* of the bow-shaped handle 18*a*, the main extension plane 64*a* of the handle housing 52*a*, and/or the separating plane 146*a*. The minimum distance 46*a* between the battery pack center of gravity 40*a* in a state arranged on the sander 10*a* and the drive axis 30*a* extends at least substantially perpendicular to the drive axis 30*a*.

By way of example, the minimum distance 46*a* between the battery pack center of gravity 40*a* and the drive axis 30*a* is at least substantially 136 mm for a battery pack 38*a* with 4 Ah electrical charge capacity, at least substantially 148 mm for a battery pack 38*a* with 8 Ah electrical charge capacity and at least substantially 160 mm for a battery pack 38*a* with 12 Ah electrical charge capacity.

The ratio of the minimum distance 46*a* between the battery pack center of gravity 40*a* in a state arranged on the sander 10*a* and the drive axis 30*a* to the maximum longitudinal extent 24*a* of the tool holder 24*a* is at least 0.85 and at most 0.95, preferably at least substantially 0.9, for a battery pack 38*a* with 4 Ah electrical charge capacity.

The ratio of the minimum distance 46*a* between the battery pack center of gravity 40*a* in a state arranged on the sander 10*a* and the drive axis 30*a* to the maximum longitudinal extent 24*a* of the tool holder 24*a* is at least 0.95 and at most 1.05, preferably at least substantially 1.0, for a battery pack 38*a* with 8 Ah electrical charge capacity.

The ratio of the minimum distance 46*a* between the battery pack center of gravity 40*a* in a state arranged on the sander 10*a* and the drive axis 30*a* to the maximum longitudinal extent 24*a* of the tool holder 24*a* is at least 1.0 and at most 1.1, preferably at least substantially 1.07, for a battery pack 38*a* with 12 Ah electrical charge capacity.

An overall center of gravity 176*a* of the handheld power tool system 36*a* is arranged in the handle recess 20*a* of the bow-shaped handle 18*a*. The overall center of gravity 176*a* of the handheld power tool system 36*a* pertains to the handheld power tool 50*a* with the battery pack 38*a* and has no dust collection container 262*a* and/or guard 120*a*. A minimum distance (not shown in this case) of the overall center of gravity 176*a* from the separating plane 146*a* of the handle housing 52*a*, from the main extension plane 64*a* of the handle housing 52*a* and/or from the main extension plane 42*a* of the bow-shaped handle 18*a* is smaller than the maximum transverse extent 200*a* of the handle housing 52*a*, in particular of the bow-shaped handle 18*a*, starting from the separating plane 146*a* of the handle housing 52*a*, the main extension plane 64*a* of the handle housing 52*a*, and/or the main extension plane 42*a* of the bow-shaped handle 18*a*. It is conceivable that the overall center of gravity 176*a* is arranged in the separating plane 146*a* of the handle housing 52*a*, in the main extension plane 64*a* of the handle housing 52*a*, and/or in the main extension plane 42*a* of the bow-shaped handle 18*a*.

A minimum distance 302*a* of the drive axis 30*a* from the overall center of gravity 176*a* has a value of at least 55 mm to at least 70 mm, in particular depending on a weight of the battery pack 38*a*. The minimum distance 302*a* of the drive axis 30*a* from the overall center of gravity 176*a* has a value of at most 65 mm to at most 75 mm, in particular depending on the weight of the battery pack 38*a*.

A maximum distance 304*a* of the tool holder 12*a* from the overall center of gravity 176*a* in the direction of the drive axis 30*a* has a value of at least 45 mm to at least 50 mm, in particular depending on the weight of the battery pack 38*a*. The maximum distance 304*a* of the tool holder 12*a* from the overall center of gravity 176*a* in the direction of the drive axis 30*a* has a value of at most 52 mm to at most 55 mm, in particular depending on a weight of the battery pack 38*a*.

Preferably, the overall center of gravity 176*a* of the handheld power tool system 36*a* is arranged with at least one battery pack 38*a* with a single-layer battery cell arrangement within the handle recess 20*a* of the bow-shaped handle 18*a*. A position of the overall center of gravity 176*a* of the handheld power tool system 36*a* with a battery pack 38*a* with a single-layer battery cell arrangement is such that the handheld power tool 50*a* can be placed on the tool holder 12*a*, in particular without tilting.

By way of example, the minimum distance 302*a* of the drive axis 30*a* from the overall center of gravity 176*a* is at least substantially 60 mm for a battery pack 38*a* with 4 Ah of electrical charging capacity and at least substantially 72 mm for a battery pack 38*a* with 8 Ah of electrical charging capacity.

By way of example, the maximum distance 304*a* from the tool holder 12*a* to the overall center of gravity 176*a* in the direction of the drive axis 30*a* is at least substantially 50 mm for a battery pack 38*a* with 4 Ah electrical charging capacity and at least substantially 53 mm for a battery pack 38*a* with 8 Ah electrical charging capacity.

A ratio of the minimum distance 46*a* between the battery pack center of gravity 40*a* in a state arranged on the sander 10*a* and the drive axis 30*a* to the maximum longitudinal extent 22*a* of the handle recess 20*a* of the bow-shaped handle 18*a* is at least 2.0 and at most 3.0.

The ratio of the minimum distance 46*a* between the battery pack center of gravity 40*a* in a state arranged on the sander 10*a* and the drive axis 30*a* to the maximum longitudinal extent 22*a* of the handle recess 20*a* of the bow-shaped handle 18*a* is at least 2.0 and at most 2.5, preferably at least substantially 2.2, for a battery pack 38*a* with 4 Ah electrical charging capacity.

The ratio of the minimum distance 46*a* between the battery pack center of gravity 40*a* in a state arranged on the sander 10*a* and the drive axis 30*a* to the maximum longitudinal extent 22*a* of the handle recess 20*a* of the bow-shaped handle 18*a* is at least 2.2 and at most 2.6, preferably at least substantially 2.4, for a battery pack 38*a* with 8 Ah electrical charging capacity.

The ratio of the minimum distance 46*a* between the battery pack center of gravity 40*a* in a state arranged on the sander 10*a* and the drive axis 30*a* to the maximum longitudinal extent 22*a* of the handle recess 20*a* of the bow-shaped handle 18*a* is at least 2.4 and at most 2.8, preferably at least substantially 2.6, for a battery pack 38*a* with 12 Ah electrical charging capacity.

The handheld power tool 50*a* comprises a handheld power tool device 48*a*, in particular a handheld sander device. The handheld power tool device 48*a* comprises the housing unit 16*a*.

The drive housing 54*a* defines the drive axis 30*a* of the drive unit 14*a*. In particular, the motor housing 78*a* defines the drive axis 30*a*. The motor housing 78*a* comprises a motor holder, in the central longitudinal axis of which a motor axis 260*a* comes to rest. The drive axis 30*a* is defined by the motor axis 260*a*. In particular, the central longitudinal axis is congruent with the drive axis 30*a*. The drive housing 54*a* is coupled to the handle housing 52*a*.

The drive housing 54*a* comprises a center bar 60*a* on a surface 56*a* of an upper side 58*a* of the drive housing 54*a*, which is raised relative to the surface 56*a*. An end 62*a* of the handle housing 52*a* is arranged above the center bar 60*a*. The center bar 60*a* drops onto the surface 56*a* in both directions, starting from a main extension plane 64*a* of the handle housing 52*a* and extending perpendicularly to the main extension plane 64*a* of the handle housing 52*a*.

Two screw domes 280*a* of the drive housing 54*a* are arranged on side walls 278*a* of the center bar 60*a*. In particular, the center bar 60*a* protrudes in a radial direction with respect to the drive axis 30*a*, whereby a further screw dome 282*a* of the drive housing 54*a* is arranged in the protruding region of the center bar 60*a*.

Figure 3:
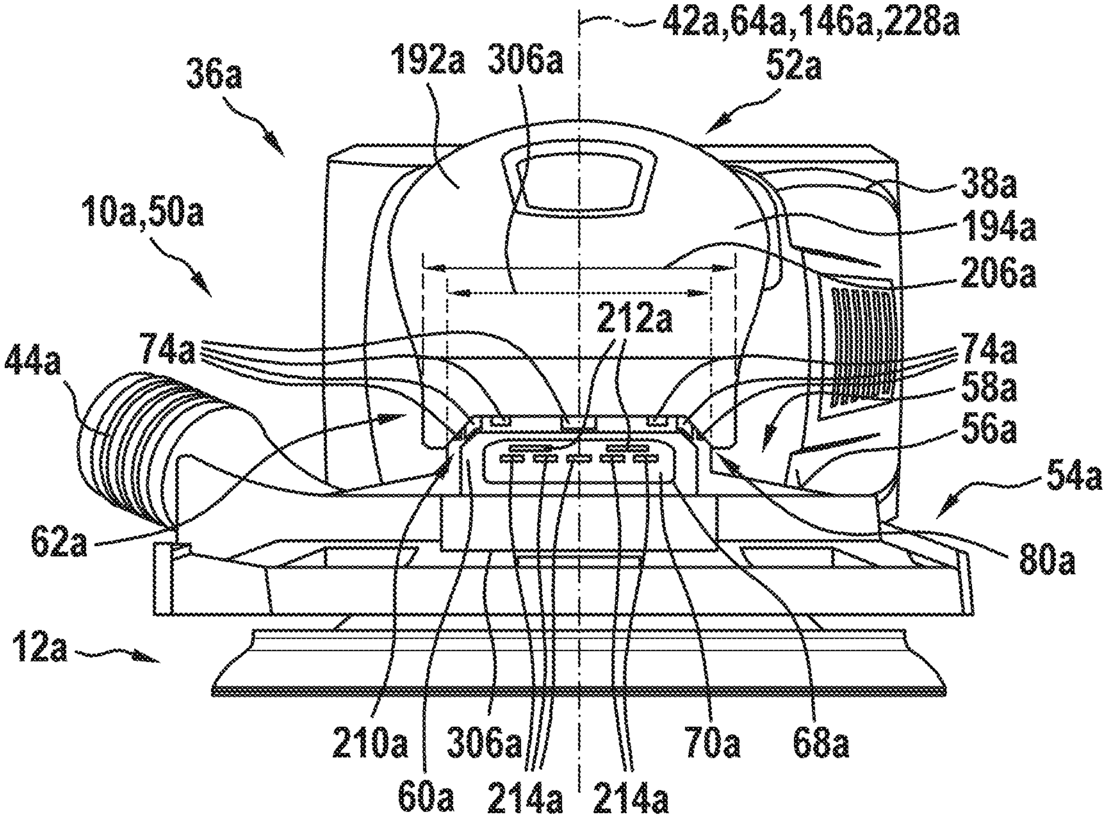

A maximum transverse extent 306*a* of the center bar 60*a* is smaller than a maximum total transverse extent 204*a* of the handle housing 52*a*. The maximum transverse extent 306*a* of the center bar 60*a* is at least substantially perpendicular to the main extension plane 42*a* of the bow-shaped handle 18*a*, to the main extension plane 64*a* of the handle housing 52*a*, to the separating plane 146*a*, and/or to the drive axis 30*a*. The maximum transverse extent 306*a* of the center bar 60*a* extends at least substantially parallel to the tool holder surface 102*a* of the tool holder 12*a*. The maximum transverse extent 306*a* of the center bar 60*a* is smaller than a maximum transverse extent 206*a* of the handle housing 52*a* at the end 62*a* of the center bar 60*a* arranged above the center bar 60*a* (see FIG. 3). The end 62*a* of the handle housing 52*a* is arranged above the center bar 60*a* with respect to the tool holder 12*a* and/or the surface 56*a*.

The center bar 60*a* has a main extension axis 208*a*. The main extension axis 208*a* of the center bar 60*a* extends at least substantially perpendicular to the drive axis 30*a*. The main extension axis 208*a* of the center bar 60*a* extends at least substantially parallel to the main extension plane 42*a* of the bow-shaped handle 18*a*, to the main extension plane 64*a* of the handle housing 52*a*, to the separating plane 146*a*, and/or to the tool holder surface 102*a*. The main extension axis 208*a* of the center bar 60*a* extends in the main extension plane 42*a* of the bow-shaped handle 18*a*, in the main extension plane 64*a* of the handle housing 52*a* and/or in the separating plane 146*a*.

The center bar 60*a* extends, in particular at least in the direction of the main extension axis 208*a* of the center bar 60*a*, over a large portion of the surface 56*a*, preferably over at least 50%, preferably over at least 75%, and particularly preferably over 90% of the surface 56*a*. The upper side 58*a*, preferably the surface 56*a*, is arranged facing away from the tool holder 12*a*. The center bar 60*a* has a curvature in the longitudinal direction, in particular in the direction of the main extension axis 208*a* of the center bar 60*a*, preferably a curvature adapted to the surface 56*a*. Alternatively, however, it is also conceivable that the center bar 60*a* is designed with no curvature in the longitudinal direction.

The handle housing 52*a* covers the center bar 60*a* at least partially on both sides along an axis extending perpendicular to the main extension plane 64*a* of the handle housing 52*a*. The handle housing 52*a* covers the center bar 60*a* in the directions perpendicular to the main extension plane 64*a* of the handle housing 52*a* on both sides at a height of at least 10%. It is also conceivable that the handle housing 52*a* largely covers the center bar 60*a* on both sides at a height in the directions extending perpendicular to the main extension plane 64*a* of the handle housing 52*a*, in particular at least 50%, preferably at least 70%, and preferably at least 90%. The center bar 60*a* is not covered by the handle housing 52*a* in the longitudinal direction.

An end 62*a* of the handle housing 52*a* facing the center bar 60*a*, in particular the end specified hereinabove, preferably an end 62*a* substantially surrounding the drive housing 54*a* in a ring-like manner, is arranged at a distance from the drive housing 54*a*, in particular at a radial and axial distance. The end 62*a* is arranged at a distance from the surface 56*a*.

The motor housing 78*a* is arranged on the center bar 60*a*. The end 62*a* surrounds the motor housing 78*a* like a ring.

The motor housing 78*a* is arranged on a side of the center bar 60*a* facing away from the tool holder 12*a*, in particular arranged above the center bar 60*a* with respect to the tool holder 12*a*. The motor housing 78*a* is enclosed by the handle housing 52*a* in a plane perpendicular to the drive axis 30*a*. The motor housing 78*a* is at least substantially completely enclosed by the handle housing 52*a* in the radial direction starting from the drive axis 30*a*. The motor housing 78*a* is designed to be at least partially integral with the center bar 60*a*. The handle housing 52*a*, in particular the end 62*a* of the handle housing 52*a*, is arranged at a distance from the drive housing 54*a*, in particular from the motor housing 78*a*.

The end 62*a* of the handle housing 52*a* facing the center bar 60*a* is adapted in shape to the drive housing 54*a*, in particular the center bar 60*a* and/or the surface 56*a*. The end 62*a* comprises two recesses 210*a* for the center bar 60*a*. It is conceivable that the end 62*a* is at a constant distance from the drive housing 54*a* in the direction of the drive axis 30*a*. Alternatively, however, it is also conceivable that the distance between the end 62*a* and the drive housing 54*a* varies in the direction of the drive axis 30*a*.

The center bar 60*a* comprises a holder 68*a* for a user interface 70*a*. Alternatively or additionally, it is conceivable that the center bar 60*a* comprises the holder 68*a* for a communication module 72*a*. The user interface 70*a* and/or the communication module 72*a* are/is a portion of the handheld power tool 50*a*, in particular the sander 10*a*, preferably the handheld power tool device 48*a*.

The communication module 72*a* can comprise one or multiple data transmission technologies, e.g. Bluetooth, NFC, or the like. Alternatively, it is conceivable that the handheld power tool 50*a*, in particular the handheld power tool device 48*a*, is designed without a communication module 72*a*.

The holder 68*a* is designed as a recess in the center bar 60*a*. The holder 68*a* is arranged on a side of the motor housing 78*a* facing away from the bow-shaped handle 18*a*. The holder 68*a* is arranged on a side of the handle housing 52*a* facing away from the battery pack interface 218*a* of the handheld power tool 50*a*. The battery pack interface 218*a* is arranged on a side of the handheld power tool 50*a*, in particular the sander 10*a*, facing away from the user interface 70*a*.

In this case, the user interface 70*a* comprises, by way of example, two input elements 212*a*. Alternatively, however, it is also conceivable that the user interface 70*a* comprises only one input element 212*a* or more than two input elements 212*a*. The input elements 212*a* of the user interface 70*a* are in this case, by way of example, designed as buttons. Alternatively, it is conceivable that at least one of the input elements 212*a* is designed as a rotary wheel, a switch, or the like. By way of example, the handheld power tool 50*a* can be switched on and/or off via the user interface 70*a*, in particular the input elements 212*a*, a rotational speed of the handheld power tool 50*a*, preferably of the sander 10*a*, can be adjusted or the like.

The user interface 70*a* in this case comprises, by way of example, five output elements 214*a*. Alternatively, it is conceivable that the user interface 70*a* comprises fewer or more than four output elements 214*a*. The output elements 214*a* are designed as lighting elements, in particular LEDs. Alternatively, it is conceivable that at least one of the output elements 214*a* is designed as a display or the like. By way of example, the user interface 70*a*, in particular via at least one of the output elements 214*a*, can be used to output a rotational speed of the handheld power tool 50*a*, preferably of the sander 10*a*, a charge status of the battery pack 38*a*, a device status of the handheld power tool 50*a*, or the like.

The user interface 70*a* is connected by data technology to a control unit 216*a* of the handheld power tool 50*a*, in particular the sander 10*a*, preferably in a wired and/or wireless manner. The control unit 216*a* is intended to control the drive unit 14*a*. In particular, the control unit 216*a* comprises at least one processor and one memory element, as well as an operating program stored on the memory element. The memory element is designed as a digital storage medium, e.g. as a hard disk or the like. The control unit 216*a* is arranged in the handle housing 52*a*.

The communication module 72*a* is configured to communicate with another device, e.g. a smartphone, a laptop, a server, a cloud, a gateway, or the like. The communication module 72*a* is connected to the control unit 216*a* and/or the user interface 70*a* by data, in particular in a wireless and/or by wired manner.

The communication module 72*a* is designed and in particular arranged separately from the user interface 70*a*. The communication module 72*a* is in this case, by way of example, arranged in the handle housing 52*a*, in particular in the bow-shaped handle 18*a*. The communication module 72*a* is arranged between the motor housing 78*a* and the battery pack interface 218*a*. The communication module 72*a* is arranged on a side of the handle housing 52*a* on which the battery pack interface 218*a* is arranged. It is also conceivable that the communication module 72*a* is a portion of the control unit 216*a*. Alternatively, it is conceivable that the communication module 72*a* is arranged in a support 220*a* of the handle housing 52*a* on the drive housing 54*a*, or in another position that a skilled person considers useful. Alternatively, it is also conceivable that the communication module 72*a* is a portion of the user interface 70*a*.

The handheld power tool 50*a* comprises multiple cooling air inlet openings 266*a*. Alternatively, it is conceivable that the handheld power tool 50*a* only comprises a cooling air inlet opening 266*a*. The cooling air inlet openings 266*a* are in this case, by way of example, arranged on the handle housing 52*a*, in particular on the bow-shaped handle 18*a*. The cooling air inlet openings 266*a* are arranged on a wall of the handle housing 52*a* delimiting the handle recess 20*a*. The cooling air inlet openings 266*a* are arranged on a wall of the handle housing 52*a* facing the tool holder 12*a* and delimiting the handle recess 20*a*. Alternatively, it is also conceivable that the cooling air inlet openings 266*a* are arranged on a wall that is closest to the battery pack interface 218*a* and delimits the handle recess 20*a*. Alternatively, however, it is also conceivable that the cooling air inlet openings 266*a* are arranged on the drive housing 54*a* or at another position on the handle housing 52*a* that a skilled person considers useful.

The handheld power tool 50*a* comprises a motorized fan 268*a*. The motor fan 268*a* is arranged in the drive housing 54*a*, in particular in the motor housing 78*a*. The motor fan 268*a* is intended for cooling the drive unit 14*a*, in particular the electric motor 190*a*. It is also conceivable that the control unit 216*a* can be cooled by means of the motor fan 268*a*. In particular, the engine fan 268*a* is intended to draw in ambient air via the cooling air inlet openings 266*a*. The motorized fan 268*a* can be driven by the drive unit 14*a*.

The drive housing 54*a* comprises multiple air outlet openings 74*a*, which are at least partially covered by the handle housing 52*a*, in particular when viewed at least in a respective main outlet direction 76*a* of the air outlet openings 74. Alternatively, however, it is conceivable that the drive housing 54*a* only comprises one air outlet opening 74, which is at least partially covered by the handle housing 52*a*, in particular when viewed at least in a main outlet direction 76*a* of the air outlet opening 74*a*. The engine fan 268*a* is intended to direct the air drawn in via the cooling air inlet openings 266*a* via the drive unit 14*a* to the air outlet openings 74*a* and, in particular, to blow the engine exhaust air out of the air outlet openings 74*a*.

The handle housing 52*a* has no air outlet openings. The drive housing 54*a*, in particular the motor housing 78*a*, comprises cooling air inlet openings 270*a*. The cooling air inlet ports 270*a* of the engine housing 78*a* are disposed on a side of the engine housing 78*a* facing away from the tool holder 12*a*. The cooling air inlet openings 270*a* of the motor housing 78*a* are arranged within the handle housing 52*a*, in particular within the palm grip 160*a*. The cooling air drawn in via the cooling air inlet openings 270*a* of the motor housing 78*a* can be introduced into the motor housing 78*a* via the cooling air inlet openings 270*a* on the handle housing 52*a*.

The air outlet openings 74*a* are at least partially covered by the handle housing 52*a*, at least when viewed in a plane extending perpendicular to the drive axis 30*a*. It is conceivable that the handle housing 52*a* covers at least most of the air outlet openings 74*a*, preferably at least 50%, preferably at least 75%, and particularly preferably at least 90%, in particular when viewed in a plane perpendicular to the drive axis 30*a*. It is also conceivable that the handle housing 52*a* completely covers the air outlet openings 74*a*, in particular when viewed in a plane perpendicular to the drive axis 30*a*. The air outlet openings 74*a* are covered by the end 62*a* of the handle housing 52*a*, in particular when viewed in a plane extending perpendicular to the drive axis 30*a*.

The motor housing 78*a* comprises the air outlet openings 74*a*. The air outlet openings 74*a* are arranged above the center bar 60*a* with respect to the tool holder 12*a* and/or the surface 56*a*. The air outlet openings 74*a* are in this case arranged, by way of example, at a distance from one another in a circumferential direction, which in particular extends in a plane perpendicular to the drive axis 30*a*.

Figure 4:
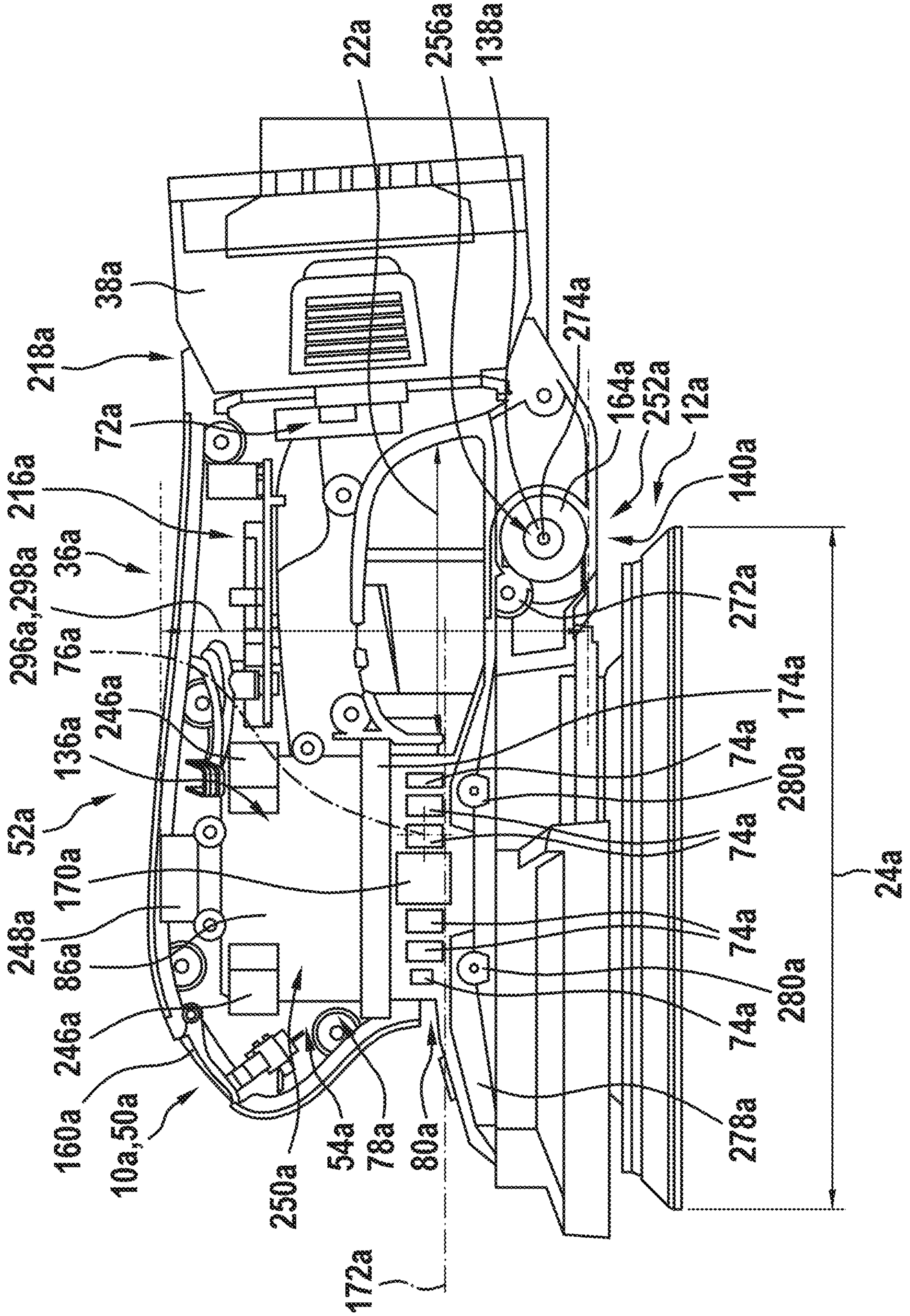

The main outlet directions 76*a* (in FIG. 4, only the main outlet direction 76*a* of one of the air outlet openings 74*a* is shown by way of example) are determined by an arrangement and/or geometry of the respective air outlet opening 74*a*. The main outlet directions 76*a* extend in this case, by way of example, at least substantially perpendicular to the drive axis 30*a*. Alternatively, however, it is also conceivable that the main outlet directions 76*a* extend at an angle to the drive axis 30*a*, preferably inclined in the direction of the tool holder 12*a*.

An opening 80*a* for the escape of air from the air outlet openings 74*a* is formed between the end 62*a* of the handle housing 52*a* facing the center bar 60*a* and the drive housing 54*a*. The opening 80*a* is arranged opposite the upper side 58*a*. The opening 80*a* is formed by arranging the end 62*a* of the handle housing 52*a* at a distance from the driving housing 54*a*, preferably the motor housing 78*a*.

The drive housing 54*a* comprises a closed cable channel 82*a*. At least a part, in particular a large part, preferably at least 50%, preferably at least 70%, of the cable channel 82*a* is covered by the handle housing 52*a*, in particular when viewed in a plane extending perpendicular to the drive axis 30*a*.

An open end 222*a* of the cable channel 82*a* is arranged at the holder 68*a*. A further open end 224*a* of the cable channel 82*a* is arranged in an inner region 226*a* of the handle housing 52*a*. The cable channel 82*a* extends from the holder 68*a* into the inner region 226*a* of the handle housing 52*a*. The cable channel 82*a* extends, in particular in the direction of the drive axis 30*a*, over the entire motor housing 78*a*.

The handheld power tool 50*a* and/or the handheld power tool device 48*a* comprises an electrical connection unit (not shown in this case). The electrical connection unit comprises at least one electrical connection element, e.g. a cable. The electrical connection unit, in particular the electrical connection element, is intended to connect the user interface 70*a* to the control unit 216*a*, in particular at least in terms of data technology and/or control technology. The user interface 70*a* can be supplied with electrical energy via the electrical connection unit, preferably via the at least one electrical connection element and/or a further electrical connection element of the electrical connection unit.

The cable channel 82*a* is intended to hold at least a portion of the electrical connection unit, in particular at least the electrical connection element and/or the further electrical connection element. The electrical connection unit, in particular the at least one electrical connection element and/or the further electrical connection element, are/is arranged at least partially in the cable channel 82*a*. The holder 68*a* comprises at least one electrical connection (not shown in this case) for the user interface 70*a*. At least the electrical connection element and/or the further electrical connection element is/are connected to the connection.

The drive housing 54*a* comprises at least two housing shells 84*a*, 86*a*. The drive housing 54*a* has a shell structure, with the two housing shells 84*a*, 86 acting as half shells. The two housing shells 84*a*, 86*a* of the drive housing 54*a* are connected to one another in a drive housing separating plane 228*a* of the drive housing 54*a*. The drive housing separating plane 228*a* extends at least substantially parallel to the separating plane 146*a* of the handle housing 52*a*. It is conceivable that the drive housing separating plane 228*a* corresponds to the separating plane 146*a* of the handle housing 52*a*. Alternatively, however, it is also conceivable that the drive housing separating plane 228*a* extends at an angle to separating plane 146*a*.

The cable channel 82*a* is arranged between the housing shells 84*a*, 86*a*. The cable channel 82*a* extends within the outer walls of the housing shells 84*a*, 86*a*, in particular within at least one outer wall of one of the housing shells 84*a*, 86*a*. The cable channel 82*a* adjoins a contact surface of the outer walls of the two housing shells 84*a*, 86*a*. A housing shell 84*a* of the housing shells 84*a*, 86*a* comprises a groove 88*a* for the cable channel 82*a*. A further housing shell 86*a* of the housing shells 84*a*, 86*a* forms a cover (not shown in this case) for the cable channel 82*a*.

The cable channel 82*a* is arranged at least partially on, in particular in, the center bar 60*a*. It is conceivable that at least a portion of the cable channel 82*a* extends through the center bar 60*a*, e.g. at least 5%, 10%, or 20% of the cable channel 82*a*.

Figure 7:
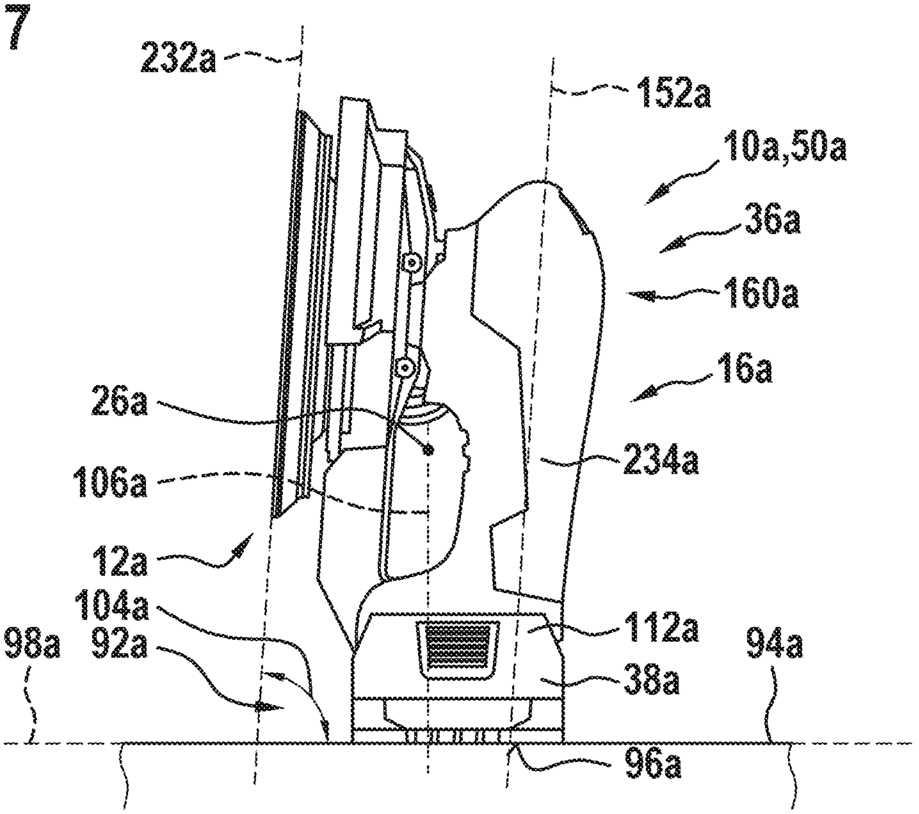

The handheld power tool system 36*a* comprises a support unit 92*a*, which is designed for placing and/or storing the sander 10*a* on a work surface 94*a* in at least one placement and/or storage position, whereby the battery pack 38*a* comprises a support surface 96*a* of the support unit 92*a* for the at least one placement and/or storage position. FIG. 7 shows the handheld power tool system 36*a* in the placement and/or storage position.

The support surface 96*a* is in this case, by way of example, a continuous surface, which in particular rests on the work surface 94*a* in the at least one placement and/or storage position. The contact surface 96*a* is in this case, by way of example, a flat surface. The work surface 94*a* can, e.g., be a floor, a table, or the like. In particular, the battery pack 38*a* comprises a battery pack housing 112*a*. The battery pack housing 112*a* comprises the contact surface 96*a*.

The battery pack 38*a* comprises a handheld power tool interface 230*a* for an electrical connection with the handheld power tool 50*a*, in particular the sander 10*a*. The handheld power tool interface 230*a* is intended to be arranged at the battery pack interface 218*a*. The support surface 96*a* is arranged on a side of the battery pack 38*a* facing away from the handheld power tool interface 230*a*.

In a state of the tool 178*a* arranged on the tool holder 12*a*, the tool holder 12*a* and/or the tool 178*a* are/is at a distance from the work surface 94*a* in the placement and/or storage position. In the placement and/or storage position, the sander 10*a* can only be stored via the support surface 96*a*. In the placement and/or storage position, the sander 10*a* is at a distance from the work surface 94*a*. In the placement and/or storage position, the sander 10*a* is connected to the work surface 94*a* via the battery pack 38*a* and can preferably be placed on the work surface 94*a*. In the placement and/or storage position, only the contact surface 96*a* on the battery pack 38*a* of the handheld power tool system 36*a* is in contact with the work surface 94*a*.

A main extension plane 98*a* of the support surface 96*a* extends to the main extension plane 232*a* of the tool holder surface 102*a* of the tool holder 12*a* at an angle 104*a* other than 90°. A main extension axis (not shown in this case) of the handheld power tool 50*a*, in particular of the sander 10*a*, extends at an angle other than 90° to the main extension plane 98*a* of the support surface 96*a* in the placement and/or storage position. The tool holder surface 102*a* extends at least substantially parallel to the main extension axis of the handheld power tool 50*a*, in particular of the sander 10*a*. Alternatively, it is conceivable that the tool holder surface 102*a* extends at an angle to the main extension axis of the handheld power tool 50*a*, in particular the sander 10*a*.

In particular, a handle axis 152*a* of the handle housing 52*a* extends at an angle other than 90° to the main extension plane 98*a* of the support surface 96*a* in the placement and/or storage position. The handle axis 152*a* is defined by the bow-shaped handle 18*a*. The handle axis 152*a* extends along the separating plane 146*a* and/or along the main extension plane 64*a* of the handle housing 52*a*, in particular along the main extension plane 42*a* of the bow-shaped handle 18*a*. The handle axis 152*a* corresponds to a main extension axis of a handle tube 234*a* of the bow-shaped handle 18*a*.

The main extension plane 232*a* of the tool holder surface 102*a* and the main extension plane 98*a* of the supporting surface 96*a* include an angle 104*a* which is greater than 80°. The angle 104*a* enclosed by the main extension plane 232*a* of the tool holder surface 102*a* and the main extension plane 98*a* of the supporting surface 96*a* has a value of less than 90° and greater than 80°. Particularly preferably, the angle 104*a* enclosed by the main extension plane 98*a* of the supporting surface 96*a* and the main extension plane 232*a* of the tool holder surface 102*a* has a value of at least substantially 86°.

The tool holder 12*a*, preferably the tool holder surface 102*a*, is inclined in the placement and/or storage position in a direction facing away from the work surface 94*a*. A normal 106*a* of the main extension plane 98*a* of the support surface 96*a* intersects the battery pack 38*a* and the center of gravity 26*a* of the sander 10*a*.

Figure 8:
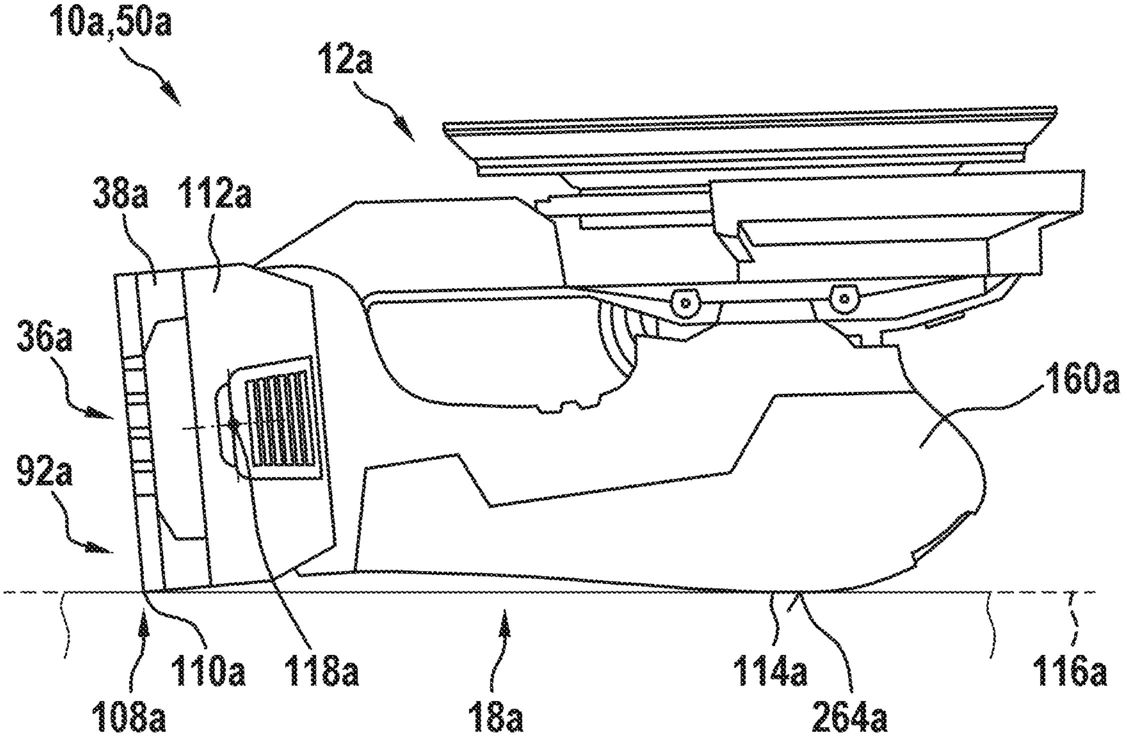

The support unit 92*a* is designed for placing and/or storing the sander 10*a* on the work surface 94*a* in at least one further placement and/or storage position, whereby the battery pack 38*a* comprises a further support surface 108*a* of the support unit 92*a* for the further placement and/or storage position. FIG. 8 shows the handheld power tool system 36*a* in the further placement and/or storage position.

In the further placement and/or storage position, the tool holder surface 102*a* extends at least substantially parallel to a support plane 116*a* of the further placement and/or storage position and/or to the flat work surface 94*a*. In the further placement and/or storage position, the drive axis 30*a* extends at least substantially perpendicular to the support plane 116*a* of the further placement and/or storage position. An edge 110*a* of the battery pack housing 112*a* of the battery pack 38*a* forms the further support surface 108*a*. The edge 110*a* is arranged facing away from the tool holder 12*a*.

A main extension axis 118*a* of the battery pack 38*a* extends at least substantially perpendicular to the main extension axis of the sander 10*a*. The edge 110*a* of the battery pack housing 112*a* extends at least substantially perpendicular to the main extension axis of the handheld power tool 50*a*, in particular the sander 10*a*.

The sander 10*a* comprises only one support point 114*a*, which comes to rest in the support plane 116*a* of the further placement and/or storage position. The support point 114*a* is located on the handle housing 52*a*. Alternatively, it is also conceivable that the support point 114*a* is located on the drive housing 54*a*. The support point 114*a* of the sander 10*a* is arranged on a side of the handle housing 52*a* facing away from the tool holder 12*a*. The support point 114*a* is located on a surface 264*a* of the palm grip 160*a*. The palm grip 160*a* has a round shape. The surface 264*a* of the palm grip 160*a*, on which the support point 114*a* is arranged, is curved. Alternatively, however, it is also conceivable that the surface 264*a* of the palm grip 160*a*, on which the support point 114*a* is arranged, is flat.

In the further placement and/or storage position, the further support surface 108*a* and the support point 114*a* of the sander 10*a* are situated in the support plane 116*a* of the further placement and/or storage position. In the further placement and/or storage position, the handheld power tool system 36*a* is in contact with the work surface 94*a* via the further placement surface 108*a* on the battery pack 38*a* and via the support point 114*a* on the sander 10*a*.

The handheld power tool device 48*a* comprises the protective device 120*a* specified hereinabove, in particular a wall protection ring, for collision protection of the tool 178*a*, which can be arranged on the handheld power tool 50*a*, and/or the tool holder 12*a* with objects in a working environment of the handheld power tool 50*a*. The protective device 120*a* is designed in particular as a protective ring. The protective device 120*a* is preferably configured as a bumper for the handheld power tool 50*a*. In particular, the protective device 120*a* is intended to counteract a stop of the tool holder 12*a* and/or the tool 178*a* arranged on the tool holder 12*a* against walls or the like in the working environment.

The protective device 120*a* comprises a shutter unit 122*a* and/or a light guide unit 124*a* for at least one light source 132*a*.

The protective device 120*a* is arranged on the drive housing 54*a* in at least one operating state. The protective device 120*a* is intended to be arranged on the fan housing 166*a*. The shutter unit 122*a* is intended to shield a region from an incidence of light from the at least one light source 132*a*. The shutter unit 122*a* comprises multiple shutter elements 100*a*. Alternatively, it is conceivable that the shutter unit 122*a* comprises only one shutter element 100*a*. The shutter elements 100*a* are designed as opaque components. It is also conceivable that the shutter elements 100*a* are designed as reflectors, e.g. as mirrors or the like.

The protective device 120*a* comprises a base body 236*a*. The base body 236*a* comprises multiple windows 276*a*. The operator can look at the workpiece through the windows 276*a* when working on the workpiece. Alternatively, however, it is also conceivable that the base body 236*a* is designed without windows 276*a*.

The shutter unit 122*a*, in particular the shutter elements 100*a*, are designed to be integral with the base body 236*a*. The shutter unit 122*a*, in particular the shutter elements 100*a*, is/are formed by the base body 236*a* of the protective device 120*a*.

Alternatively, it is also conceivable that the shutter unit 122*a*, in particular the shutter elements 100*a*, is/are designed to be separate from the base body 236*a*. In particular, it is alternatively conceivable that the shutter unit 122*a*, preferably the shutter elements 100*a*, is/are attachable to the base body 236*a*, preferably detachably. It is also conceivable that the shutter unit 122*a*, in particular the shutter elements 100*a*, can be arranged adjustably on the base body 236*a*, preferably in order to adjust a shielding region by the shutter unit 122*a*.

The light guide unit 124*a* is arranged on the base body 236*a*. The light guide unit 124*a* in this case comprises, by way of example, three light guide elements 238*a*. Alternatively, it is conceivable that the light guide unit 124*a* comprises more or less than three light guide elements 238*a*. The light guide unit 124*a* is intended to guide and/or emit light from the at least one light source 132*a*. The light guide elements 238*a* are, by way of example, designed as transparent fibers, tubes, or rods. The light guide elements 238*a* are in this case, by way of example, designed as radiating elements, in particular as light-scattering elements, e.g. in the form of a roughening, a scattering glass, plastic or ceramic platelet, a scattering plastic film, or the like.

The shutter unit 122*a* is intended to block a light emission of at least one light source 132*a* at least in the direction of an intended operator side. The shutter unit 122*a* is intended to block a light emission of the at least one light source 132*a* in a direction facing away from the tool holder 12*a*.

It is conceivable that the protective device 120*a* comprises a light source unit 126*a*. The light source unit 126*a* comprises in this case, by way of example, two light sources 132*a*. Alternatively, it is also conceivable that the light source unit 126*a* comprises a different number of light sources 132*a* from two, for example only one light source 132*a* or more than two light sources 132*a*. Furthermore, it is alternatively conceivable that the protective device 120*a* is designed without a light source unit 126*a*. The light source unit 126*a*, in particular the light sources 132*a*, is/are arranged on the base body 236*a*. The light sources 132*a* are, e.g., designed as LEDs, as incandescent lamps or as another light source that a skilled person considers useful. Alternatively, it is also conceivable that the handheld power tool 50*a* comprises at least one of the light sources 132*a*.

It is also conceivable that the protective device 120*a* comprises at least one energy source 128*a* for at least one light source 132*a*. The protective device 120*a* comprises in this case, by way of example, two energy sources 128*a*. One of the energy sources 128*a* is associated with each of the light sources 132*a*. Alternatively, however, it is also conceivable that the protective device 120*a* comprises only one energy source 128*a* or more than two energy sources 128*a* or is designed without energy sources 128*a*. The energy sources 128*a* are, e.g., designed as batteries, rechargeable batteries, or the like.

The energy sources 128*a* are intended to supply energy to the respective light source 132*a*, in particular the light source unit 126*a*. The energy sources 128*a* are connected to the light sources 132*a*, in particular the light source unit 126*a*, at least in one operating state. Alternatively or additionally, however, it is also conceivable that the light sources 132*a*, in particular the light source unit 126*a*, are/can be supplied with electrical energy via the handheld power tool 50*a*, in particular the sander 10*a*, for example via an electrical plug connection between the protective device 120*a* and the handheld power tool 50*a*.

The protective device 120*a* in this case comprises, by way of example, an operating element 130*a* for the light sources 132*a*, in particular the light source unit 126*a*. The at least one operating element 130*a* is arranged on the base body 236*a*. The at least one operating element 130*a* can, e.g., be designed as a button, a rotary wheel, a switch, or the like. The at least one control element 130*a* can, e.g., be used to switch the light sources 132*a* on and/or off and/or to set a lighting parameter, e.g. a light color, an intensity, or the like.

Furthermore, it is conceivable that the protective device 120*a* comprises a sensor unit 134*a* for detecting an operation of the handheld power tool 50*a*, in particular for activating at least one light source 132*a* during operation of the handheld power tool 50*a*.

The sensor unit 134*a* is arranged on the base body 236*a*. The sensor unit 134*a* comprises at least one sensor element (not shown in this case), e.g. a vibration sensor or the like, for detecting operation of the handheld power tool 50*a*, in particular the sander 10*a*. The sensor unit 134*a* comprises control electronics (not shown in this case) for processing the sensor signals. The control electronics are connected to the light sources 132*a* for control purposes. The control electronics are intended to switch on the light sources 132*a* when operation of the handheld power tool 50*a* is detected. It is conceivable that the control electronics are a portion of the control unit 216*a* of the hand-held power tool 50*a*. Alternatively, however, it is also conceivable that the control electronics are designed to be separate from the control unit 216*a*.

The protective device 120*a* is at least partially made of a thermoplastic elastomer. The base body 236*a* is at least partially made of a thermoplastic elastomer. At least one surface 240*a* of the protective device 120*a* facing away from the handheld power tool 50*a*, in particular of the base body 236*a*, is made of a thermoplastic elastomer.

It is also conceivable that the protective device 120*a* comprises a protective layer consisting at least partially of a thermoplastic elastomer. The protective layer can be a cover placed over the base body 236*a*, a layer glued to the base body 236*a*, or the like. Alternatively or additionally, it is also conceivable that the protective layer is clamped, screwed, or the like onto the base body 236*a*. Furthermore, it is also conceivable that the base body 236*a* is overmolded by the protective layer, in particular that the protective layer is overmolded onto the base body 236*a*, e.g. in a two-component injection molding process.

Figure 9A:
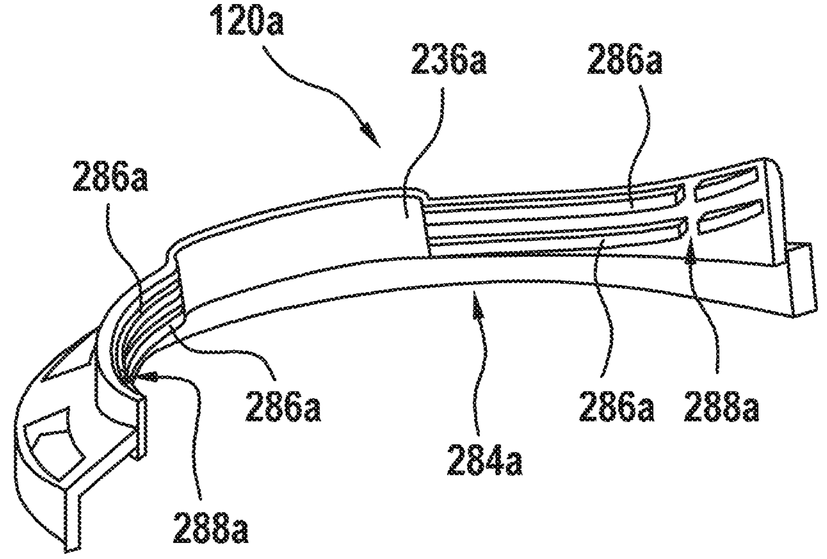
Figure 9B:
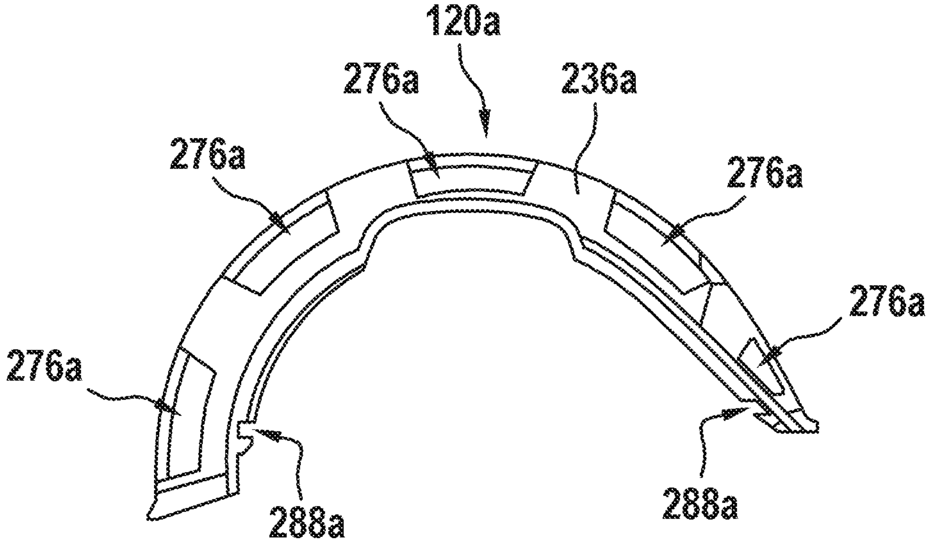

The protective device 120*a* comprises a fastening unit 284*a* for detachable fastening to the handheld power tool 50*a* (see FIGS. 9A and 9B). The fastening unit 284*a* comprises two pairs of fixing rails 286*a* extending parallel to each other. The fixing rails 286*a* each comprise a locking recess 288*a*.

Figure 10A:
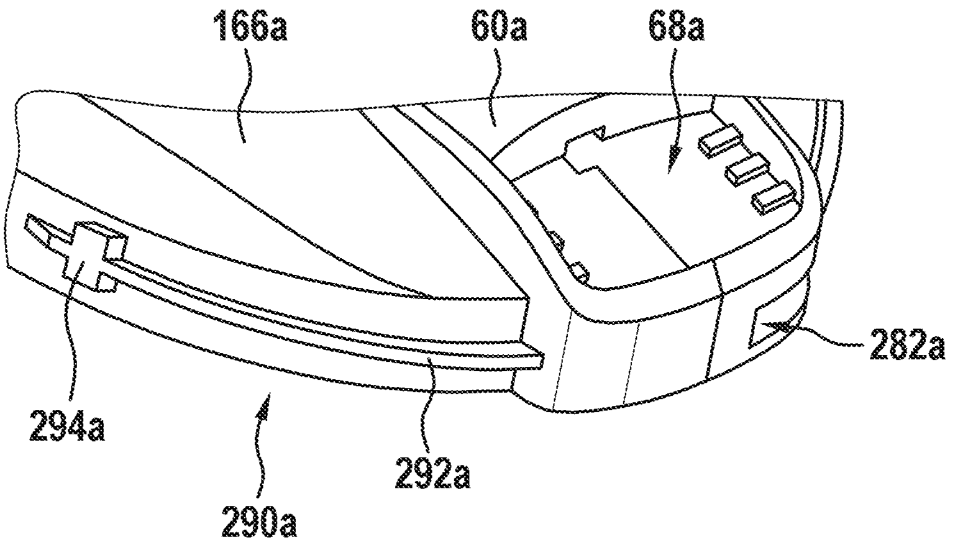
Figure 10B:
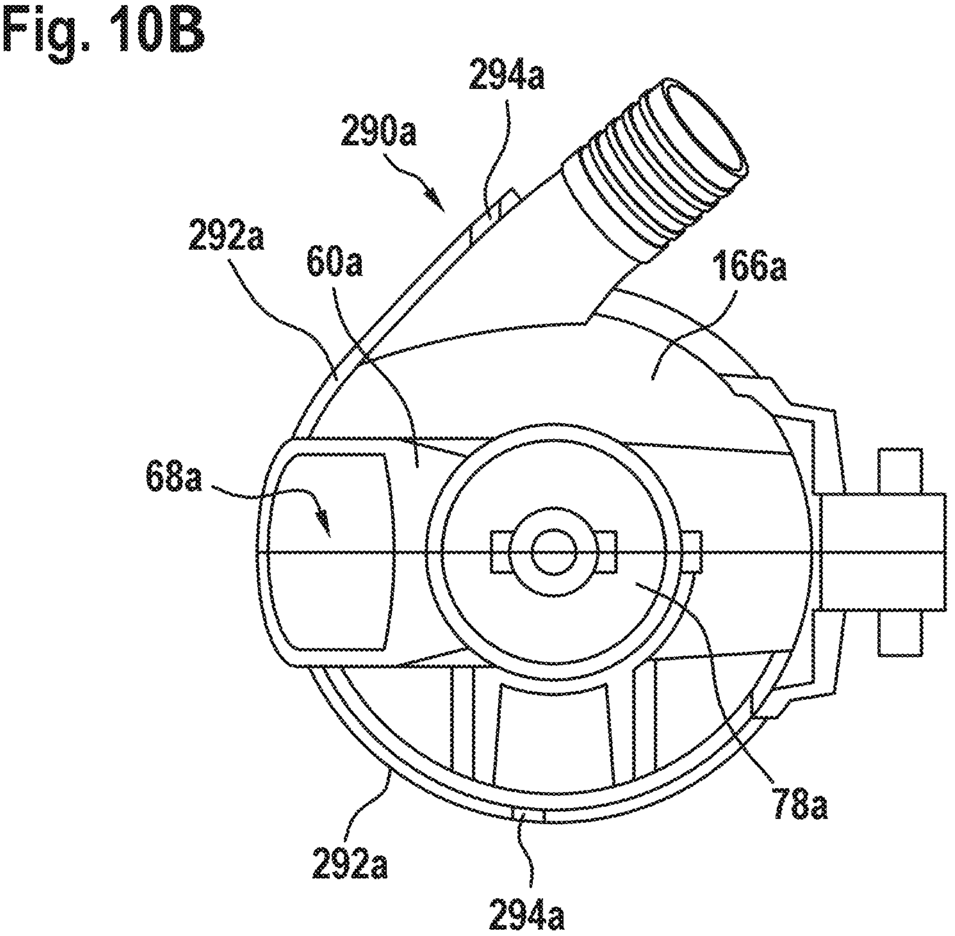

The handheld power tool 50*a*, in particular the drive housing 54*a*, preferably the fan housing 166*a*, comprises a protective fastening unit 290*a* corresponding to the fastening unit 284*a* (see FIGS. 10A and 10B).

The protective mounting unit 290*a* comprises two fixing rails 292*a*. The fixing rails 292*a* of the protective fastening unit 290*a* are arranged between the fixing rails 286*a* of the fastening unit 284*a* in a state of the protective device 120*a* arranged on the handheld power tool 50*a*. The fixing rails 286*a* of the fastening unit 284*a* and the fixing rails 292*a* of the protective fastening unit 290*a* are intended for fixing in an axial direction relative to one another, preferably with respect to the drive axis 30*a*. The protective fastening unit 290*a* comprises two latching elements 294*a*, in particular latching hooks or the like. The latching elements 294*a* are intended to cooperate with the latching recesses 288*a* of the fastening unit 284*a* in order to fasten the protective device 120*a* to the handheld power tool 50*a*.

The protective device 120*a* has an asymmetrical basic shape, in particular adapted to a dust outlet 44*a* of the handheld power tool 50*a*. A shape of the base body 236*a* deviates from a circular shape along its longitudinal extent in at least one section, preferably in a region of the dust outlet 44*a*.

The handheld power tool device 48*a* comprises a damping unit 136*a*, which couples the drive housing 54*a* to the handle housing 52*a*. The drive housing 54*a* comprises an extension arm 138*a* extending at least radially with respect to the drive axis 30*a*. At least a portion 140*a* of the damping unit 136*a* is arranged on the extension arm 138*a*. The housing shells 84*a*, 86 are screwed together on the extension arm 138*a*, in particular via a screw dome 274*a* of the housing shells 84*a*, 86*a*. A screw dome 272*a* of the handle housing shells 192*a*, 194*a* in the region of the extension arm 138*a* is arranged at a distance from the screw dome 274*a* of the housing shells 84*a*, 86*a*.

The damping unit 136*a* comprises multiple damping elements 164*a*, 170*a*, 246*a*, 248*a*. The damping elements 164*a*, 170*a*, 246*a*, 248*a* are made of at least one elastic material, in particular an elastic plastic. The damping elements 164*a*, 170*a*, 246*a*, 248*a* can be designed as blocks, rings, ring segments, plates, or the like.

At least a portion of the damping elements 164*a*, 170*a*, 246*a*, 248*a* are fixed between the drive housing 54*a* and the handle housing 52*a* by means of a clamp. It is also conceivable that the damping elements 164*a*, 170*a*, 246*a*, 248*a* comprise an adhesive layer for attachment to the drive housing 54*a* and/or to the handle housing 52*a*. Additionally or alternatively, it is conceivable that at least a portion of the damping elements 164*a*, 170*a*, 246*a*, 248*a* can be attached to the handle housing 52*a* and/or the drive housing 54*a* by means of damping element holders, e.g. recesses, holding bolts, or the like, and/or by means of a screw connection or the like.

The portion 140*a* of the damping unit 136*a* on the extension arm 138*a* comprises, e.g., two damping elements 164*a* of the damping elements 164*a*, 170*a*, 246*a*, 248*a*. Alternatively, it is also conceivable that the portion 140*a* of the damping unit 136*a* on the extension arm 138*a* comprises only one damping element 164*a* or more than two damping elements 164*a*.

The drive housing 54*a* is connected to the handle housing 52*a* via the damping elements 164*a*, 170*a*, 246*a*, 248*a*. The damping unit 136*a* is intended for vibration decoupling of the handle housing 52*a* from the drive housing 54*a*. The handle housing 52*a* is coupled to the drive housing 54*a* via two different coupling regions 250*a*, 252*a* of the damping unit 136*a*. The handle housing 52*a* comprises two inner regions 226*a*, 254*a* at a distance from one another, in each of which a portion of the drive housing 54*a* is arranged. The two coupling regions 250*a*, 252*a* are arranged in the two inner regions 226*a*, 254*a*.

The extension arm 138*a* is arranged on a side of the drive housing 54*a* facing the battery pack interface 218*a*. The extension arm 138*a* is arranged within the handle housing 52*a*, in particular in a further inner region 254*a* of the two inner regions 226*a*, 254*a* of the handle housing 52*a*. The extension arm 138*a* forms an outermost point of the drive housing 54*a* when viewed in a direction perpendicular to the drive axis 30*a* and extending along the separating plane 146*a*. The extension arm 138*a* is at least partially enclosed by the handle housing 52*a*. It is also conceivable that the communication module 72*a* is arranged between the extension arm 138*a* and the battery pack interface 218*a*, in particular in the further inner region 254*a*.

The extension arm 138*a* comprises at least one damping element holder 256*a* for the damping elements 164*a*. The shape of the damping elements 164*a* is adapted to the damping element holder 256*a*. The damping element holder 256*a* comprises two holding bolts for holding one of the respective ring-shaped damping elements 164*a*. The damping element holder 256*a* is intended to hold the damping elements 164*a* perpendicular to the main extension plane 64*a* of the handle housing 52*a*, in particular to the main extension plane 42*a* of the bow-shaped handle 18*a* and/or to the separating plane 146*a*. The extension arm 138*a* is, by way of example, in this case T-shaped, particularly in order to hold the at least two dampening elements 164*a*.

Alternatively, however, it is also conceivable that, e.g., the damping element holder 256*a* is designed as a recess, in particular for holding a damping element 164*a* designed as a block, plate, or the like. The damping elements 164*a* are fixed to the damping element holder 256*a* via the handle housing 52*a*, in particular the handle housing shells 192*a*, 194*a*. Alternatively or additionally, however, it is also conceivable that the damping elements 164*a* are glued, screwed, or the like to the damping element holder 256*a*.

Figure 6:
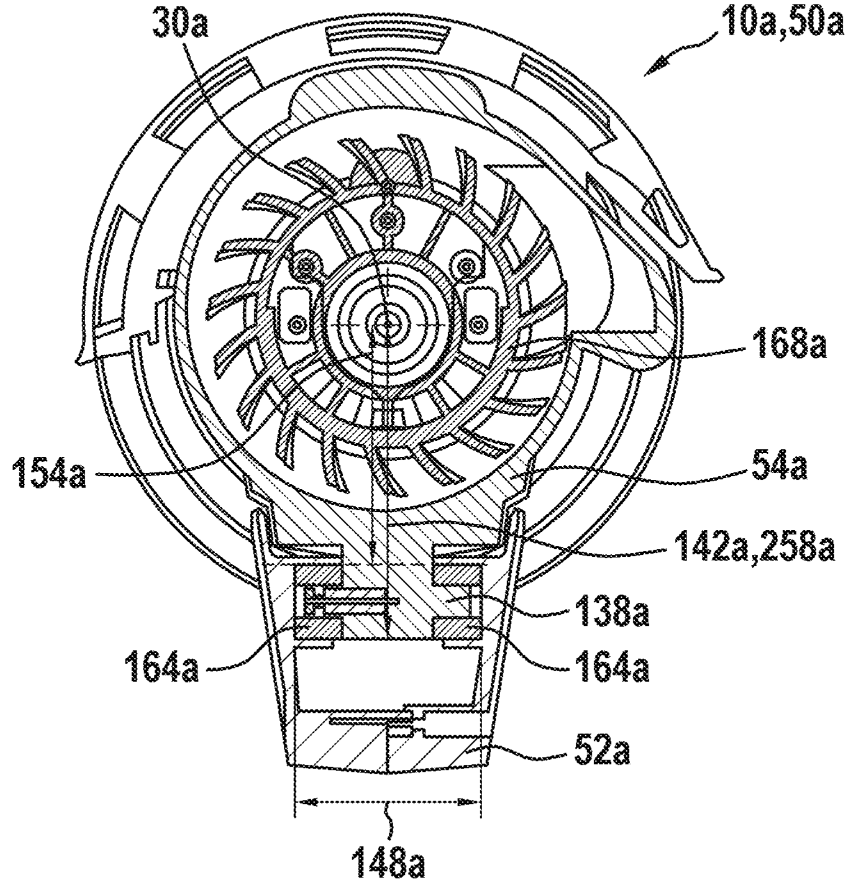

A maximum distance 142*a* of the extension arm 138*a* from the drive axis 30*a* is greater than a maximum distance 144*a* of the tool holder 12*a* from the drive axis 30*a*, in particular when viewed along a separating plane 146*a* of the handle housing 52*a* (see FIG. 6). A maximum distance 258*a* of the portion 140*a* of the damping unit 136*a* on the extension arm 138*a* from the drive axis 30*a* is greater than the maximum distance 144*a* of the tool holder 12*a* from the drive axis 30*a*, in particular as viewed along the separating plane 146*a* of the handle housing 52*a*.

A ratio of a maximum transverse extent 148*a* of the portion 140*a* of the damping unit 136*a* to a minimum distance 150*a* of the portion 140*a* of the damping unit 136*a* from the handle axis 152*a* of the handle housing 52*a* is at least 0.9 and at most 1.05. The maximum transverse extent 148*a* of the portion 140*a* of the damping unit 136*a* extends at least substantially perpendicular to the main extension plane 64*a* of the handle housing 52*a*, in particular the main extension plane 42*a* of the bow-shaped handle 18*a*, and/or the separating plane 146*a*. The maximum transverse extent 148*a* of the portion 140*a* of the damping unit 136*a* extends at least substantially parallel to the tool holder surface 102*a*. The minimum distance 150*a* of the portion 140*a* of the damping unit 136*a* from the handle axis 152*a* is measured parallel to the separating plane 146*a*, in particular to the main extension plane 42*a* of the bow-shaped handle 18*a*, preferably to the main extension plane 64*a* of the handle housing 52*a*.

The maximum transverse extent 148*a* of the portion 140*a* of the damping unit 136*a* is in this case, by way of example, at least 40 mm, preferably at least 45 mm. The maximum transverse extent 148*a* of the portion 140*a* of the damping unit 136*a* is in this case, by way of example, at most 60 mm, preferably at most 50 mm. The maximum transverse extent 148*a* of the portion 140*a* of the damping unit 136*a* is defined by a maximum distance between the two damping elements 164*a*, in particular in a direction perpendicular to the main extension plane 42*a* of the bow-shaped handle 18*a*.

A ratio of the maximum transverse extent 148*a* of the portion 140*a* of the damping unit 136*a* to the maximum height 34*a* of the sander 10*a* is preferably at least 0.35, preferably at least 0.4. The ratio of the maximum transverse extent 148*a* of the portion 140*a* of the damping unit 136*a* to the maximum height 34*a* of the sander 10*a* is preferably at most 0.5, preferably at most 0.45.

The minimum distance 150*a* of the portion 140*a* of the damping unit 136*a* from the handle axis 152*a* is preferably at least 45 mm, preferably at least 50 mm. The minimum distance 150*a* of the portion 140*a* of the damping unit 136*a* from the handle axis 152*a* is preferably at most 60 mm, preferably at most 55 mm. Alternatively, however, it is also conceivable that the minimum distance 150*a* of the portion 140*a* of the damping unit 136*a* from the handle axis 152*a* is less than 45 mm or greater than 60 mm.

A ratio of the maximum transverse extent 148*a* of the portion 140*a* of the damping unit 136*a* to a minimum distance 154*a* of the portion 140*a* of the damping unit 136*a* from the drive axis 30*a* is at least 0.7, preferably at least 0.73. The ratio of the maximum transverse extent 148*a* of the portion 140*a* of the damping unit 136*a* to the minimum distance 154*a* of the portion 140*a* of the damping unit 136*a* from the drive axis 30*a* is at most 0.8, preferably at most 0.75. The minimum distance 154*a* of the portion 140*a* of the damping unit 136*a* from the drive axis 30*a* is measured parallel to the separating plane 146*a*, in particular to the main extension plane 42*a* of the bow-shaped handle 18*a*, preferably to the main extension plane 64*a* of the handle housing 52*a*.

The minimum distance 154*a* of the portion 140*a* of the damping unit 136*a* from the drive axis 30*a* is preferably at least 55 mm, preferably at least 60 mm. The minimum distance 154*a* of the portion 140*a* of the damping unit 136*a* from the drive axis 30*a* is preferably at most 70 mm, preferably at most 65 mm. Alternatively, however, it is also conceivable that the minimum distance 154*a* of the portion 140*a* of the damping unit 136*a* from the drive axis 30*a* is less than 55 mm or greater than 70 mm.

A ratio of a maximum height 156*a* of the housing unit 16*a* to the minimum distance 150*a* of the portion 140*a* of the damping unit 136*a* on the extension arm 138*a* from the handle axis 152*a* of the handle housing 52*a* is at most 2.25. The maximum height 156*a* of the housing unit 16*a* extends along the separating plane 146*a*, in particular along the main extension plane 64*a* of the handle housing 52*a*, preferably along the main extension plane 42*a* of the bow-shaped handle 18*a*.

The maximum height 156*a* of the housing unit 16*a* extends parallel to the drive axis 30*a*. The maximum height 156*a* of the housing unit 16*a* is in this case, by way of example, at least 90 mm, preferably at least 100 mm. The maximum height 156*a* of the housing unit 16*a* is in this case, by way of example, at most 120 mm, preferably at most 110 mm. Alternatively, however, it is also conceivable that the maximum height 156*a* of the housing unit 16*a* in the direction of the drive axis 30*a* is less than 90 mm or greater than 120 mm.

A ratio of a maximum extent 296*a* of the damping unit 136*a*, in particular a maximum distance 298*a* of the damping elements 164*a*, 170*a*, 246*a*, 248*a*, in the direction of the drive axis 30*a* to the maximum height 156*a* of the housing unit 16*a* is at least 0.8, preferably at least 0.85. A ratio of the maximum extent 296*a* of the damping unit 136*a*, in particular the maximum distance 298*a* of the damping elements 164*a*, 170*a*, 246*a*, 248*a*, in the direction of the drive axis 30*a* to the maximum height 34*a* of the sander 10*a* is at least 0.7, preferably at least 0.75. The maximum extent 296*a* of the damping unit 136*a*, in particular the maximum distance 298*a* of the damping elements 164*a*, 170*a*, 246*a*, 248*a*, in the direction of the drive axis 30*a* is in this case, by way of example, at least 85 mm, preferably at least 90 mm (see FIG. 4).

A ratio of the minimum distance 154*a* of the portion 140*a* of the damping unit 136*a* from the drive axis 30*a* in a direction perpendicular to the drive axis 30*a* to a maximum longitudinal extent 158*a* of the housing unit 16*a* is greater than 0.3. The maximum longitudinal extent 158*a* of the housing unit 16*a* extends perpendicular to the drive axis 30*a*. The maximum longitudinal extent 158*a* of the housing unit 16*a* extends at least substantially parallel to the tool holder surface 102*a*. The maximum longitudinal extent 158*a* of the housing unit 16*a* extends along the separating plane 146*a*, preferably along the main extension plane 64*a* of the handle housing 52*a*, in particular the main extension plane 42*a* of the bow-shaped handle 18*a*.

The maximum longitudinal extent 158*a* of the housing unit 16*a* is preferably at least 175 mm, preferably at least 180 mm. The maximum longitudinal extent 158*a* of the housing unit 16*a* is preferably at most 190 mm, preferably at most 185 mm. Alternatively, however, it is also conceivable that the maximum longitudinal extent 158*a* of the housing unit 16*a* is less than 175 mm or greater than 190 mm.

A ratio of the minimum distance 154*a* between the portion 140*a* of the damping unit 136*a* and the drive axis 30*a* to the minimum distance 150*a* between the portion 140*a* of the damping unit 136*a* and the handle axis 152*a* of the handle housing 52*a* is at least 1.2 and at most 1.3.

The bow-shaped handle 18*a* is supported via the portion 140*a* of the damping unit 136*a* and/or via the extension arm 138*a* on the drive housing 54*a* to form the closed handle recess 20*a* of the bow-shaped handle 18*a*.

The portion 140*a* of the damping unit 136*a* and/or the extension arm 138*a* is arranged in the direction of the handle axis 152*a* at the height of the handle recess 20*a*. The portion 140*a* of the damping unit 136*a* on the extension arm 138*a* and/or the extension arm 138*a* is, viewed in the direction of the handle axis 152*a*, arranged at least substantially completely within the maximum longitudinal extent 22*a* of the handle recess 20*a*.

The two damping elements 164*a* of the portion 140*a* of the damping unit 136*a* on the extension arm 138*a* are arranged at a distance from one another. The damping elements 164*a* are arranged on opposite sides of the extension arm 138*a*. The damping elements 164*a* are arranged on mutually different sides of the separating plane 146*a*, in particular the main extension plane 64*a* of the handle housing 52*a*, preferably the main extension plane 42*a* of the bow-shaped handle 18*a*. The damping elements 164*a* are arranged mirror-symmetrically with respect to the separating plane 146*a*, in particular the main extension plane 64*a* of the handle housing 52*a*, preferably the main extension plane 42*a* of the bow-shaped handle 18*a*.

The extension arm 138*a* is arranged on the fan housing 166*a*. The extension arm 138*a* is designed to be at least partially integral with the fan housing 166*a*. The extension arm 138*a* is arranged on a side of the fan housing 166*a* facing the battery pack interface 218*a*. The fan housing 166*a* is arranged between the motor housing 78*a* and the tool holder 12*a*. The extraction fan 168*a* is made of metal, in particular cast metal. Alternatively, however, it is also conceivable that the extraction fan 168*a* is made of plastic or a combination of plastic and metal.

The motor housing 78*a* and the fan housing 166*a* are at least partially designed to be integral with one another. The fan housing 166*a* and the motor housing 78*a* comprise common housing shells 84*a*, 86*a*. The two housing shells 84*a*, 86*a* each comprise one half of the fan housing 166*a* and one half of the motor housing 78*a*.

Two further damping elements 170*a* of the damping unit 136*a* are, e.g., arranged on the motor housing 78*a* such that the damping elements 170*a* are only partially enclosed by the handle housing 52*a* in a sectional plane 172*a* perpendicular to the drive axis 30*a* as viewed through the respective damping element 170*a*. Alternatively, however, it is also conceivable that the damping unit 136*a* comprises only one further damping element 170*a* or more than two further damping elements 170*a*.

The two further damping elements 170*a* are arranged between the handle housing 52*a* and the motor housing 78*a*. The two further damping elements 170*a* are arranged inside the handle housing 52*a*. The two further damping elements 170*a* are arranged on opposite sides of the motor housing 78*a*, in particular on different housing shells 84*a*, 86*a*. The two further damping elements 170*a* are arranged on different sides of the separating plane 146*a* and/or the drive housing separating plane 228*a*. The two further damping elements 170*a* are arranged symmetrically to the parting plane 146*a* and/or to the drive housing separating plane 228*a*. The two further damping elements 170*a* are designed to be cube-shaped. The further damping elements 170*a* are arranged at the height of the air outlet openings 74*a* when viewed in the axial direction.

The damping unit 136*a* comprises two sealing elements 174*a*, in particular a sealing ring in order to block an inlet of exhaust air into the handle housing 52*a*. The sealing elements 174*a* are arranged between the handle housing 52*a* and the drive housing 54*a*.

The sealing elements 174*a* are designed as circular arc segments. The sealing elements 174*a* are arranged inside the handle housing 52*a*. The sealing elements 174*a* are arranged on opposite sides of the motor housing 78*a*, in particular on different housing shells 84*a*, 86*a*. The sealing elements 174*a* are arranged on different sides of the separating plane 146*a* and/or the drive housing separating plane 228*a*. The sealing elements 174*a* are arranged symmetrically to separating plane 146*a* and/or to the drive housing separating plane 228*a*.

Alternatively, however, it is also conceivable that the damping unit 136*a* comprises only one sealing element 174*a* or more than two sealing elements 174*a*. The sealing elements 174*a* surround the motor housing 78*a* in a circumferential direction, which in particular extends in a plane perpendicular to the drive axis 30*a*, at least substantially completely, preferably in an angular range of at least 270°, preferably of at least 330°, and particularly preferably of at least 350°.

The sealing elements 174*a* are intended to at least substantially completely fill a gap between the motor housing 78*a* and the handle housing 52*a*. The sealing elements 174*a* are made of an elastic material, preferably an elastic plastic. The sealing elements 174*a* preferably have material hardness that is different from that of the damping elements 164*a*, 170*a*, 246*a*, 248*a*. The material hardness of the sealing elements 174*a* is lower than a material hardness of the damping elements 164*a*, 170*a*, 246*a*, 248*a*. Alternatively, it is conceivable that the sealing elements 174*a* and the damping elements 164*a*, 170*a*, 246*a*, 248*a* have an identical material hardness. The scaling elements 174*a* are arranged above the air outlet openings 74*a* with respect to the tool holder 12*a*. The sealing elements 174*a* are additionally intended to support and/or decouple the handle housing 52*a* from the drive housing 54*a*.

The damping unit 136*a* comprises four additional damping elements 246*a*. Alternatively, however, it is also conceivable that the damping unit 136*a* comprises fewer than four additional damping elements 246*a* or more than four additional damping elements 246*a*. The additional damping elements 246*a* are arranged between the handle housing 52*a* and the motor housing 78*a*. The additional damping elements 246*a* are arranged within the handle housing 52*a*. The additional damping elements 246*a* are arranged uniformly in a circumferential direction of the motor housing 78*a*, which in particular extends in a plane perpendicular to the drive axis 30*a*.

In each case, two of the additional damping elements 246*a* are arranged on opposite sides of the motor housing 78*a*, in particular on different housing shafts 84*a*, 86*a*. In each case, two of the additional damping elements 246*a* are arranged on different sides of the separating plane 146*a* and/or the drive housing separating plane 228*a*.

The additional damping elements 246*a* are arranged symmetrically to separating plane 146*a* and/or the drive housing separating plane 228*a*. The additional damping elements 246*a* are designed to be cube-shaped. The two sealing elements 174*a* are arranged between the further damping elements 170*a* and the additional damping elements 246*a* when viewed in the axial direction.

The damping unit 136*a* comprises a further additional damping element 248*a*. The further additional damping element 248*a* is intended for damping axial relative movements, in particular vibrations, between the drive housing 54*a* and the handle housing 52*a* with respect to the drive axis 30*a* and/or for axial support between the handle housing 52*a* and the drive housing 54*a*. Alternatively or additionally, however, it is also conceivable that the further additional damping element 248*a* is intended for damping radial movements and/or for radial support between the handle housing 52*a* and the drive housing 54*a*. The further additional damping element 248*a* is preferably arranged in an extension of the motor axis 260*a*, preferably between the motor housing 78*a* and the handle housing 52*a*.

The further additional damping element 248*a* is in this case, by way of example, designed in the shape of a circular cylinder. Alternatively, however, it is also conceivable that the further additional damping element 248*a* is designed to be cube-shaped or the like. The further additional damping element 248*a* is in this case, by way of example, arranged in a preloaded manner between the drive housing 54*a* and the handle housing 52*a*.

The maximum extent 296*a* of the damping unit 136*a*, in particular the maximum distance 298*a* of the damping elements 164*a*, 170*a*, 246*a*, 248*a*, in the direction of the drive axis 30*a* is defined by a maximum distance between the further additional damping element 248*a* and the damping elements 164*a* in the direction of the drive axis 30*a*.

Figure 11:
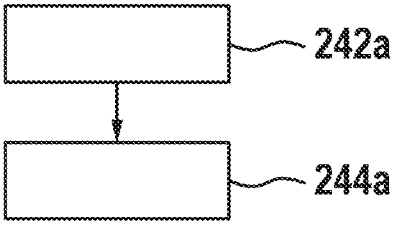

FIG. 11 shows a schematic sequence of a method for manufacturing a handheld power tool device 48*a*, in particular the one specified hereinabove. The protective device 120*a* is made at least partially of a thermoplastic elastomer.

In one method step, in particular a shaping step 242*a*, the base body 236*a* is shaped. In one method step, in particular an overmolding step 244*a*, the base body 236*a* is overmolded by a protective layer of thermoplastic elastomer. Alternatively, it is also conceivable that the base body 236*a* is already at least partially molded by a thermoplastic elastomer, in particular during the molding step 242*a*.

Figure 12:
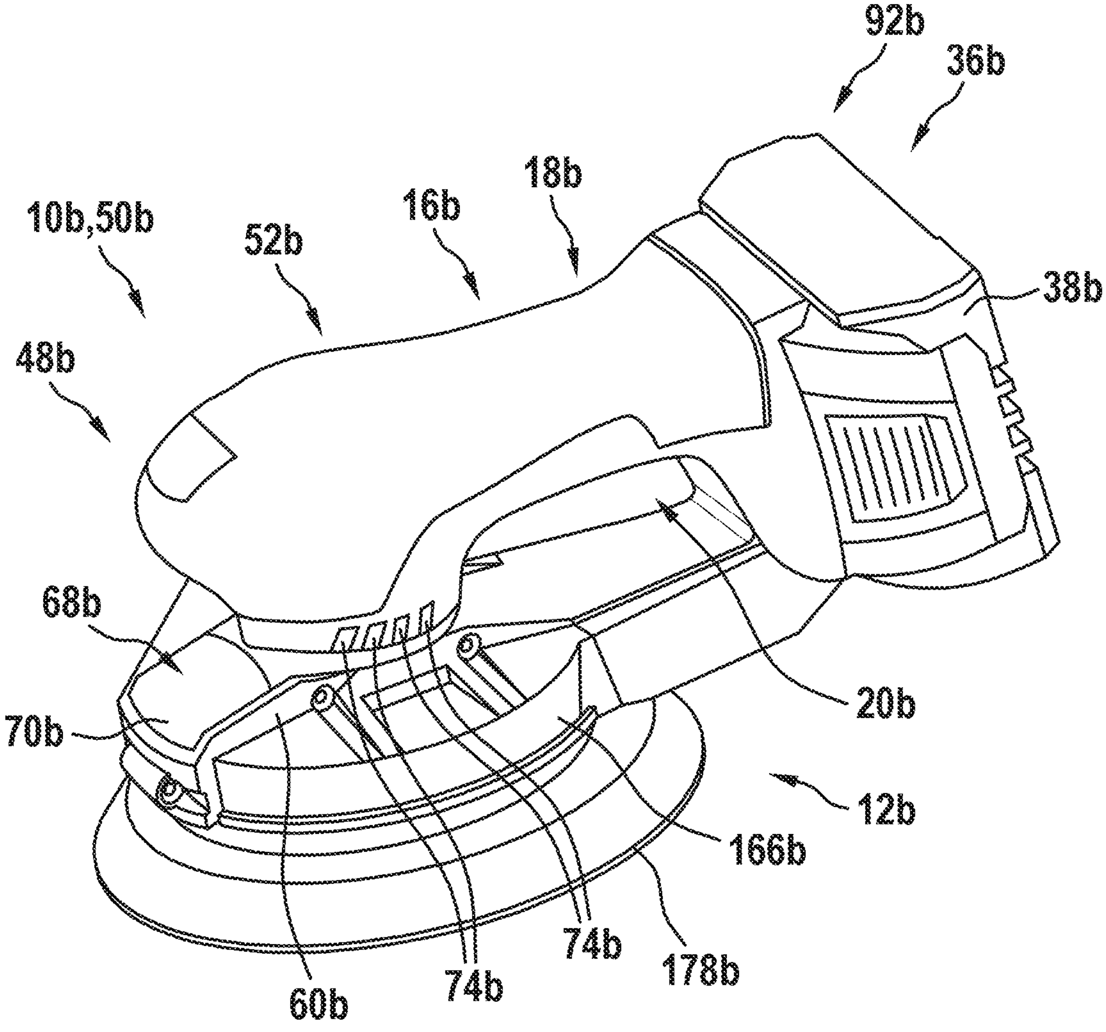

FIG. 12 shows a further exemplary embodiment of the invention. The following descriptions and the drawings are substantially limited to the differences between the exemplary embodiments, whereby reference can also be made in principle to the drawings and/or the description of the other exemplary embodiments, in particular FIGS. 1 to 11, with regard to components with the same designation, in particular with regard to components having the same reference signs. To differentiate between the exemplary embodiments, the letter a is placed after the reference signs of the exemplary embodiment in FIGS. 1 to 11. In the exemplary embodiment in FIG. 12, the letter a is replaced by the letter b.

FIG. 12 shows a handheld power tool system 36*b* comprising a handheld power tool 50*b*. The handheld power tool 50*b* is designed as a sander 10*b*. The handheld power tool 50*b* is designed as a battery-operated sander. Alternatively, however, it is also conceivable that the handheld power tool 50*b*, in particular the sander 10*b*, is designed as a grid-powered handheld power tool. The sander 10*b* is designed as a random orbital sander. Alternatively, however, it is also conceivable that the sander 10*b* is designed as an orbital sander, a delta sander, or the like.

The handheld power tool 50*b* comprises a tool holder 12*b*, in particular a sanding pad for holding a tool 178*b*. The handheld power tool 50*b* comprises a drive unit (not shown in this case) for driving the tool holder 12*b*.

The handheld power tool 50*b* comprises a housing unit 16*b*.

The housing unit 16*b* comprises a handle housing 52*b* and a fan housing 166*b* for holding an extraction fan. The fan housing 166*b* is designed as a metal housing, in particular as an aluminum housing. Alternatively, however, it is also conceivable that the fan housing 166*b* is at least partially designed as a plastic housing. The handle housing 52*b* comprises a bow-shaped handle 18*b*. The handle housing 52*b* is coupled to the fan housing 166*b*. A drive unit, in particular at least one electric motor, of the handheld power tool 50*b* is arranged in the handle housing 52*b*.

A ratio of a maximum longitudinal extent of a handle recess 20*b* of the bow-shaped handle 18*b* to a maximum longitudinal extent of the tool holder 12*b* is at least 0.35 and at most 0.5. The bow-shaped handle 18*b* is designed to be closed. Viewed in the main extension plane of the bow-shaped handle 18*b*, the handle recess 20*b* is enclosed, in particular delimited, by walls of the handle housing 52*b*. The fan housing 166*b* lies directly against the handle housing 52*b*. The handle housing 52*b* comprises air outlet openings 74*b*.

The handheld power tool 50*b* comprises a handheld power tool device 48*b*. The housing unit 16*b* is a portion of the handheld power tool device 48*b*. The fan housing 166*b* comprises a center bar 60*b* on a surface of an upper side of the fan housing 166*b* that is raised relative to the surface. The center bar 60*b* drops onto the surface in both directions starting from a main extension plane (not shown in this case) of the handle housing 52*b* and extending perpendicularly to the main extension plane of the handle housing 52*b*.

The handheld power tool system 36*b* comprises a battery pack 38*b* for supplying power to the handheld power tool 50*b*. The handheld power tool system 36*b* comprises a support unit 92*b*, which is designed for placing and/or storing the sander 10*b* on a work surface (not shown in this case) in at least one placement and/or storage position, whereby the battery pack 38*b* comprises a support surface of the support unit 92*b* for the at least one placement and/or storage position.

The handheld power tool 50*b* comprises a holder 68*b* for a user interface 70*b* of the handheld power tool 50*b*. The holder 68*b* is limited by the handle housing 52*b* and the fan housing 166*b*.

The invention claimed is:

1. A handheld power tool device for a sander, comprising:

a housing unit including a handle housing and a drive housing configured to hold a drive unit, the drive housing defining a drive axis of the drive unit; and a damping unit configured to couple the drive housing to the handle housing, wherein the drive housing comprises an extension arm configured to extend, at least radially with respect to the drive axis and on which at least a portion of the damping unit is arranged.

2. The handheld power tool device according to claim 1, further comprising:

a tool holder configured to hold a tool, wherein a maximum distance of the extension arm from the drive axis is greater than a maximum distance of the tool holder from the drive axis, along a separating plane of the handle housing.

3. The handheld power tool device according to claim 1, wherein a ratio between a maximum transverse extent of the portion of the damping unit and a minimum distance of the portion of the damping unit from a handle axis of the handle housing is at least 0.9 and at most 1.05.

4. The handheld power tool device according to claim 1, wherein a ratio between a maximum transverse extent of the portion of the damping unit and a minimum distance of the portion of the damping unit from the drive axis is at least 0.7 and at most 0.8.

5. The handheld power tool device according to claim 3, wherein a ratio between a maximum height of the housing unit and the minimum distance of the portion of the damping unit on the extension arm from the handle axis of the handle housing is at most 2.25.

6. The handheld power tool device according to claim 1, wherein a ratio between a minimum distance of the portion of the damping unit from the drive axis in a direction perpendicular to the drive axis and a maximum longitudinal extent of the housing unit is greater than 0.3.

7. The handheld power tool device according to claim 1, wherein a ratio between a minimum distance between the portion of the damping unit and the drive axis and a minimum distance between the portion of the damping unit and a handle axis of the handle housing is at least 1.2 and at most 1.3.

8. The handheld power tool device according to claim 1, wherein the handle housing comprises a bow-shaped handle supported by the portion of the damping unit and/or the extension arm on the drive housing in order to form a closed handle recess of the bow-shaped handle.

9. The handheld power tool device according to claim 8, wherein the portion of the damping unit and/or the extension arm is arranged in a direction of the handle axis at a height of the handle recess.

10. The handheld power tool device according to claim 1, wherein the portion of the damping unit arranged on the extension arm comprises at least two damping elements arranged at a distance from one another.

11. The handheld power tool device according to claim 1, wherein:

the housing unit comprises a fan housing configured to hold extraction fan, and the extension arm is arranged on the fan housing.

12. The handheld power tool device according to claim 1, wherein:

the drive housing comprises a motor housing configured to hold the drive unit and a fan housing configured to hold an extraction fan, and the motor housing and the fan housing are configured to be least partially integral with one another.

13. The handheld power tool device according to claim 1, wherein the drive housing comprises a motor housing, on which at least one damping element of the damping unit is arranged, such that the damping element is only partially enclosed by the handle housing through the damping element in a sectional plane perpendicular to the drive axis.

14. The handheld power tool device according to claim 1, wherein:

the damping unit comprises at least one sealing element configured to block an inlet of exhaust air into the housing unit, and the at least one sealing element is arranged between the handle housing and the drive housing.

15. A sander comprising:

a handheld power tool device according to claim 1.

* * * * *